US012132679B2

(12) United States Patent
Awad et al.

(10) Patent No.: US 12,132,679 B2
(45) Date of Patent: Oct. 29, 2024

(54) COMMUNICATIONS DEVICE, INFRASTRUCTURE EQUIPMENT AND METHODS

(71) Applicant: Sony Corporation, Tokyo (JP)

(72) Inventors: Yassin Aden Awad, Basingstoke (GB); Shin Horng Wong, Basingstoke (GB); Kazuyuki Shimezawa, Basingstoke (GB); Vivek Sharma, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 642 days.

(21) Appl. No.: 17/262,746

(22) PCT Filed: Jul. 18, 2019

(86) PCT No.: PCT/EP2019/069365
§ 371 (c)(1),
(2) Date: Jan. 25, 2021

(87) PCT Pub. No.: WO2020/020738
PCT Pub. Date: Jan. 30, 2020

(65) Prior Publication Data
US 2021/0143967 A1    May 13, 2021

(30) Foreign Application Priority Data
Jul. 26, 2018 (EP) .................................. 18185911

(51) Int. Cl.
*H04L 5/00* (2006.01)
*H04W 72/0453* (2023.01)
*H04W 72/23* (2023.01)

(52) U.S. Cl.
CPC .......... *H04L 5/0053* (2013.01); *H04L 5/0007* (2013.01); *H04L 5/0098* (2013.01); *H04W 72/0453* (2013.01); *H04W 72/23* (2023.01)

(58) Field of Classification Search
None
See application file for complete search history.

(56) References Cited

U.S. PATENT DOCUMENTS

2019/0132845 A1\* 5/2019 Babaei .................. H04L 1/1812
2019/0254073 A1\* 8/2019 Sheng ................... H04W 72/23
(Continued)

OTHER PUBLICATIONS

International Search Report and Written Opinion Mailed on Dec. 18, 2019, received for PCT Application No. PCT/EP2019/069365 Filed on Jul. 18, 2019, 15 Pages.
(Continued)

Primary Examiner — Kodzovi Acolatse
(74) Attorney, Agent, or Firm — XSENSUS LLP

(57) ABSTRACT

A communications device for communicating with an infrastructure equipment of a wireless communications network, the communications device comprising a transceiver configured to transmit signals and to receive signals on a wireless access interface of the wireless communications network using a plurality of activated bandwidth parts, each being formed from communications resources of a carrier within a carrier bandwidth, and a processor configured to control the transceiver to transmit the signals and to receive the signals, wherein the processor is configured in combination with the transceiver to transmit signals or to receive signals using a first of the plurality of activated bandwidth parts, to receive, via the first activated bandwidth part, an indication of one or more bandwidth parts to be activated, to select one or more bandwidth parts to be de-activated in accordance with a maximum number of activated bandwidth parts permitted for the communications device.

18 Claims, 8 Drawing Sheets

(56) References Cited

U.S. PATENT DOCUMENTS

| | | | |
|---|---|---|---|
| 2019/0254110 A1* | 8/2019 | He | H04L 5/0048 |
| 2020/0021407 A1* | 1/2020 | Abdoli | H04L 5/001 |
| 2020/0245184 A1* | 7/2020 | Jin | H04L 69/22 |
| 2020/0288507 A1* | 9/2020 | Chang | H04L 5/0094 |
| 2020/0337069 A1* | 10/2020 | Jiang | H04W 16/14 |
| 2021/0111856 A1* | 4/2021 | Zhou | H04L 5/001 |
| 2021/0119759 A1* | 4/2021 | Xue | H04W 72/0453 |

OTHER PUBLICATIONS

Catt, "Remaining aspects of BWP operation", 3GPP TSG RAN WG1 Meeting No. 90bis R1-1717839, Prague, Czechia, Oct. 9-13, 2017, 4 Pages.

Huawei et al., "Overview of bandwidth part, CA, and DC operation including SRS switching", 3GPP TSG RAN WG1 Meeting NR#3 R1-1715425, Nagoya, Japan, Sep. 18-21, 2017, 14 Pages.

3GPP, "3rd Generation Partnership Project; Technical Specification Group Radio Access Network; NR; NR and NG-RAN Overall Description", Stage 2, Release 15, 3GPP TS 38.300 V15.2.0, Jun. 2018, pp. 1-87.

Holma et al., "LTE for UMTS OFDMA and SC-FDMA based radio access", John Wiley and Sons, 2009, pp. 25-27.

3GPP, "3rd Generation Partnership Project; Technical Specification Group Radio Access Network; Study on Scenarios and Requirements for Next Generation Access Technologies", Release 14, 3GPP TR 38.913 V14.2.0, Mar. 2017, pp. 1-38.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2019/069365, filed Jul. 18, 2019, which claims priority to EP 18185911.7, filed Jul. 26, 2018, the entire contents of each are incorporated herein by reference.

BACKGROUND

Field

The present disclosure relates to communications devices, infrastructure equipment and methods for the communication by a communications device with an infrastructure equipment in a cell of a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of terminal devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a communications device for communicating in a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and a processor configured to control the transceiver to transmit the signals and to receive the signals. The processor is configured in combination with the transceiver to transmit signals or to receive signals using a first of the plurality of activated bandwidth parts, to receive, via the first activated bandwidth part, an indication of one or more bandwidth parts to be activated, to select one or more bandwidth parts to be de-activated in accordance with a maximum number of activated bandwidth parts permitted for the communications device, and in response to the selecting, to de-activate the selected one or more bandwidth parts.

Embodiments of the present technique, which further relate to infrastructure equipment, methods of operating communications devices and infrastructure equipment and circuitry for communications devices and infrastructure equipment, allow for the efficient use of communications resources in a wireless communications network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
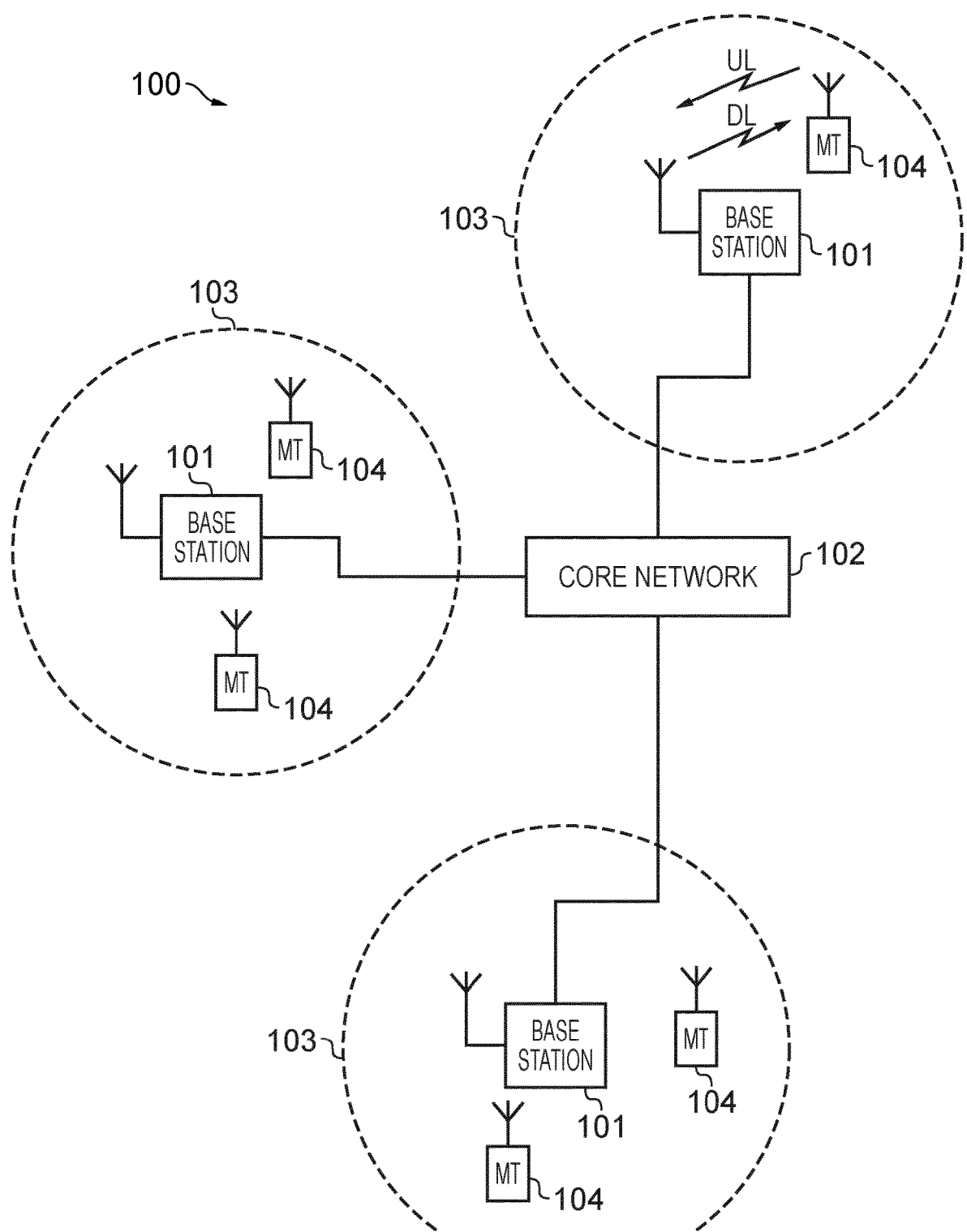
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from terminal devices 104. Data is transmitted from the base stations 101 to the terminal devices 104 within their respective coverage areas 103 via a radio downlink. Data is transmitted from the terminal devices 104 to the base stations 101 via a radio uplink. The core network part 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
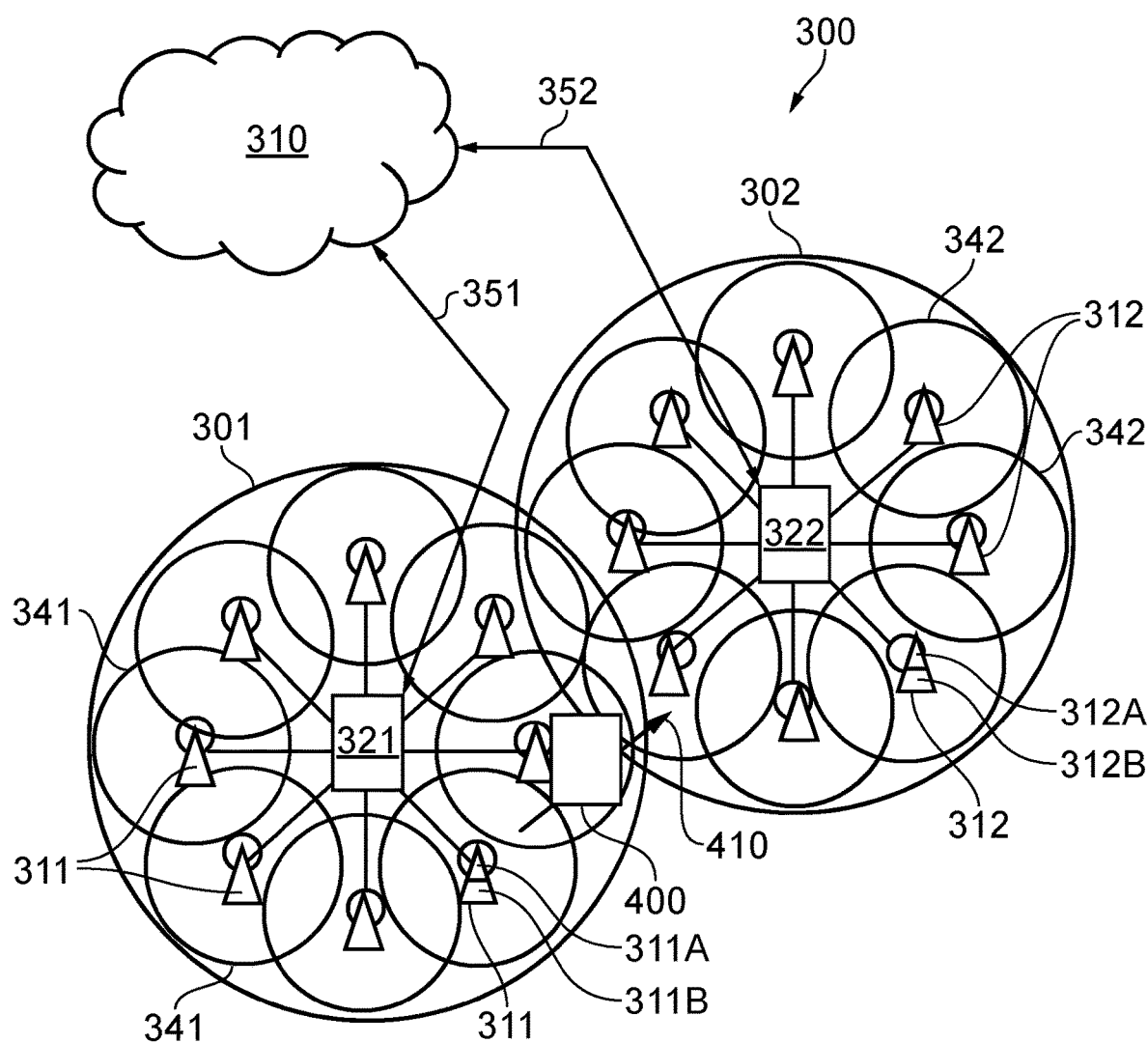
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating, or even if any distributed units 311 are connected to the controlling node 26 and involved in the routing of communications at all. In such cases, as far as the terminal device is concerned, it simply transmits uplink data to the controlling node 321 and receives downlink data from the controlling node 26 and the terminal device has no awareness of the involvement of the distributed units 311, though may be aware of radio configurations transmitted by distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

In wireless telecommunications networks, such as LTE type or 5G type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to the RRC connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in the RRC idle mode to exchange data with a network involves the terminal device first performing an RRC connection procedure (random access procedure) with the network.

After establishing an RRC connection and exchanging the relevant data, the UE may then perform RRC disconnection and move back into idle mode for power saving.

A wireless telecommunications network, such as a 5G (NR) network may support an RRC Inactive (RRC_INACTIVE) mode, in which, as in the RRC idle mode, it may not transmit data, but must transition to the RRC connected mode in order to transmit or receive data. In both the RRC Inactive and RRC Idle modes, mobility (i.e. change of serving cell) is by means of UE-based cell reselection in accordance with parameters transmitted by the wireless telecommunications network. In the RRC connected mode, mobility may be network-controlled; that is, a handover may be initiated by an infrastructure equipment of the network. The handover may be conventionally initiated in response to, for example, measurement reports transmitted by the terminal device, which may indicate the result of measurements of downlink signals transmitted by the network in both the serving cell and one or more neighbour (candidate) cells.

New Radio Access Technology (5G)

As mentioned above, the embodiments of the present invention can also find application with advanced wireless communications systems such as those referred to as 5G or New Radio (NR) Access Technology. The use cases that are considered for NR include:

Enhanced Mobile Broadband (eMBB)
    Massive Machine Type Communications (mMTC)
    Ultra Reliable & Low Latency Communications (URLLC) [1]

eMBB services are characterised by high capacity with a requirement to support up to 20 Gb/s. The requirement for URLLC is a reliability of 1-10-5 (99.999%) for one transmission of a 32 byte packet with a user plane latency of 1 ms [3].

The elements of the wireless access network shown in FIG. 1 may be equally applied to a 5G new RAT configuration, except that a change in terminology may be applied as mentioned above.

Ultra Reliable Low Latency Communications (URLLC)

Ultra reliable low latency communications (URLLC) service, have recently been proposed within 3GPP for 4G and 5G communications networks. In some examples, URLLC communications are either low latency (where the user plane latency target is 1 ms) or high reliability (where the acceptable error rate on URLLC transmissions is 10-5) or both low latency and high reliability (where both the latency and reliability targets need to be met at the same time).

Various techniques have been proposed in order to achieve the low latency and high reliability targets. Low latency can be achieved through one or more of the following techniques (which can be applied in combination):

Short scheduling interval. Transmissions can be scheduled at frequent intervals. The scheduling interval may be less than the duration of a slot in the frame (e.g. when the slot duration is 1 ms, it may be possible to schedule URLLC every 0.1 ms, i.e. with a scheduling interval of 0.1 ms).

Short TTI. The transmission time interval (TTI) of a URLLC transmission may consist of a small number of OFDM symbols (i.e. much smaller than the duration of a slot).

On the fly decoding format. The format of the URLLC transmission may be designed to allow for "on the fly decoding". For example, reference symbols for channel estimation purposes may be located in the first OFDM symbol of the URLLC transmission and each OFDM symbol within the URLLC transmission can be decoded independently of other OFDM symbols (e.g. one OFDM symbol contains a whole forward error correction (FEC) code word).

The short TTI referred to above can be termed a "mini-slot". The scheduling interval may also have an extent of a mini-slot.

High reliability can be achieved through one or more of the following techniques (which can be applied in combination):

Frequency diverse transmissions: Transmission of the URLLC information over a wide bandwidth makes those transmissions resilient to frequency selective fading.

Antenna diversity: Antenna diversity makes the URLLC transmission resilient to frequency selective fading on some of the channels between transmit and receive antennas.

Robust coding and modulation: Use of powerful forward error correction codes and robust modulation formats increases the resilience of the URLLC transmission to noise.

Hybrid ARQ: The URLLC transmission is protected with a cyclic redundancy check (CRC). If the CRC indicates that the URLLC packet is incorrect, the receiver can inform the transmitter of the error and the packet can be re-transmitted.

Repetition: The URLLC transmission can be repeated, such that if an initial reception of the packet fails, a second reception of the packet can be combined with the first reception of the packet to increase the effective signal to noise ratio (SNR) of the received packet and allow decoding of the packet.

Packet duplication: URLLC packets can be sent over two cells configured either as carrier aggregation (CA) or dual connectivity (DC). Packet duplication is performed in PDCP layer for both CA and DC Bandwidth Part A communications device and an infrastructure equipment, such as the communications device 104 and infrastructure equipment 101 of FIG. 1, are configured to communicate via a wireless access interface. The wireless access interface may comprise one or more carriers, each providing within a ranges of carrier frequencies communications resources for transmitting and receiving signals according to a configuration of the wireless access interface. The one or more carriers may be configured within a system bandwidth provided for the wireless communications network of which the infrastructure equipment 101 forms part. Each of the carriers may be divided in a frequency division duplex scheme into an uplink portion and a downlink portion and may comprise one or more bandwidth parts (BWPs). A carrier may be configured therefore with a plurality of different BWP for a communications device to transmit or receive signals.

The nature of the wireless access interface may be different amongst the different BWPs. For example, where the wireless access interface is based on orthogonal frequency division multiplexing, different BWPs may have different sub-carrier spacing, symbol periods and/or cyclic prefix lengths.

BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions.

Parameters of the wireless access interface which are applicable to a BWP (e.g. sub-carrier spacing, symbol and slot durations, cyclic prefix lengths) may be referred to collectively as the numerology of a BWP.

Figure 3:
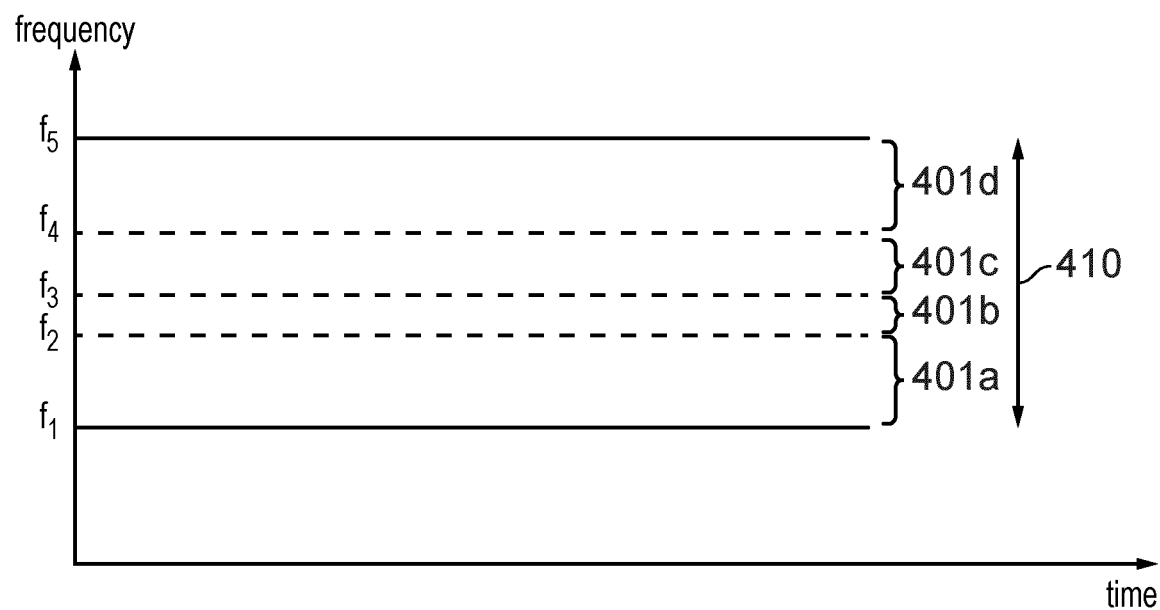
FIG. 3 illustrates a portion of a wireless access interface, in which the system bandwidth comprises multiple bandwidth parts, which may be activated and/or deactivated in accordance with embodiments of the present disclosure.

FIG. 3 shows an example of first to fourth BWPs 401*a-d* configured within a system bandwidth 410. The following Table 1 provides a summary of characteristics (including the 'numerology') of each of the BWPs 401*a-d*:

TABLE 1

Summary of BWP characteristics

| BWP | Index | Frequency range | Sub-carrier spacing |
| --- | --- | --- | --- |
| 401a | 1 | f1-f2 | 15 kHz |
| 401b | 2 | f2-f3 | 60 kHz |
| 401c | 3 | f3-f4 | 60 kHz |
| 401d | 4 | f4-f5 | 15 kHz |

As shown in Table 1, each BWP may be identified by an index number.

In the example in FIG. 3, the BWPs 401*a-d* are non-overlapping and collectively span the entire system bandwidth 410. However, in some examples, the frequency range of one or more BWPs may overlap, or be entirely within, the frequency range of another BWP. Furthermore, it is not necessary that all frequencies within the system bandwidth 410 are within the range of one or more BWPs.

Prior to being activated, a BWP may be configured for use by the communications device 104. That is, the communications device 104 may determine the characteristics of the BWP, for example, by means of radio resource control (RRC) signalling transmitted by the infrastructure equipment 101.

In some configurations (for example, in unpaired spectrum), uplink and downlink BWPs may be paired, such that any reference herein to a BWP may refer to a pair of BWPs, the pair comprising one uplink BWP and one downlink BWP. Accordingly, for example, 'activation' and 'de-activation' of a BWP may refer to the simultaneous activation or de-activation of a pair of BWPs.

Alternatively, in some embodiments, bi-directional communications may be possible within a single BWP.

In other configurations (for example, in paired spectrum) uplink and downlink BWPs may be configured and activated independently of all other BWPs [1]. References to 'a number' of BWPs (including a maximum number of BWPs) may therefore, in some configurations, refer only to downlink BWPs or only to uplink BWPs.

Conventionally, at most one BWP per direction may be activated at any given time in respect of a particular communications device.

Through the use of BWPs, a communications device may reduce its power consumption by operating only using the range of carrier frequencies which are within the activated BWP(s), which may be considerably smaller than the bandwidth of the carrier in which the BWPs are formed. For power-constrained devices (such as those that are battery-powered, and particularly for those, such as machine type communications devices, which may not be easily re-charged), such a reduction in power consumption may be of particular benefit.

An activated BWP refers to a BWP which, for the communications device 104, may be used for the transmission or reception of data to or from the communications device 104. As such, an infrastructure equipment may schedule transmissions to or by the communications device 104 only on a BWP if that BWP is currently activated for the communications device 104.

On deactivated downlink BWPs, the communications device 104 may not monitor the PDCCH, and on deactivated uplink BWPs, the communications device 104 does not transmit on PUCCH, PRACH and UL-SCH. In general terms, an activated BWP may be used for the transmission of data to (on a downlink BWP) or by (on an uplink BWP) the communications device 104.

The communications device 104 may maintain a deactivation timer in respect of each activated BWP. The deactivation timer may be started when data is transmitted or received using the BWP. If a deactivation timer expires, the associated BWP may be deactivated.

However, in light of the differing numerologies which may be applicable to BWPs, a single activated BWP may not be suitable for the transmission of data associated with different services, if those different services have different requirements (e.g. latency requirements) or characteristics (e.g. bandwidth/data rate). Additionally or alternatively, there may be insufficient capacity on a single BWP for the requirements of a single communications device Therefore, consideration has been given to the possibility of activating multiple BWPs for a single communications device.

However, a communications device may be limited in terms of the maximum number of BWPs which may be simultaneously activated.

However, no mechanism currently exists to control the activation and/or deactivation of BWPs in a scenario where a communications device 104 supports two or more activated BWPs in the same direction (i.e. uplink or downlink) simultaneously, and in particular where the communications device 104 supports at most a predetermined number (maximum) of activated BWPs per direction simultaneously.

According to embodiments of the present disclosure, there is provided a communications device for communicating with an infrastructure equipment of a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and a processor configured to control the transceiver to transmit the signals and to receive the signals. The processor is configured in combination with the transceiver to transmit signals or to receive signals using a first of the plurality of activated bandwidth parts, to receive, via the first activated bandwidth part, an indication of one or more bandwidth parts to be activated, to select one or more bandwidth parts to be de-activated in accordance with a maximum number of activated bandwidth parts permitted for the communications device, and in response to the selecting, to de-activate the selected one or more bandwidth parts.

A BWP may be designated as a primary BWP which is always activated and which may be used for transmitting control information to or by the communications device 104 (depending on whether it is an uplink or downlink BWP). Since the primary BWP is always activated (and thus may be used for data transmission), it may be necessary to activate one or more further (secondary) BWPs only if the primary BWP is unsuitable (e.g. because of its numerology) or insufficient e.g. due to congestion or lack of bandwidth.

Because the primary BWP is always activated, the communications device 104 may not maintain a deactivation timer associated with the primary BWP.

Alternatively, a BWP may be designated as a default type BWP, that is, a BWP having an activation or deactivation priority which differs from the activation or deactivation priority of other, non-default BWPs. In some embodiments, as will be described, a default BWP may be preferentially activated or deactivated with lowest preference. A default type BWP (which may be referred to as a default BWP) may further be preferentially used for transmitting an indication that a different BWP is to be activated or de-activated. There may be one or more default BWPs.

Figure 4:
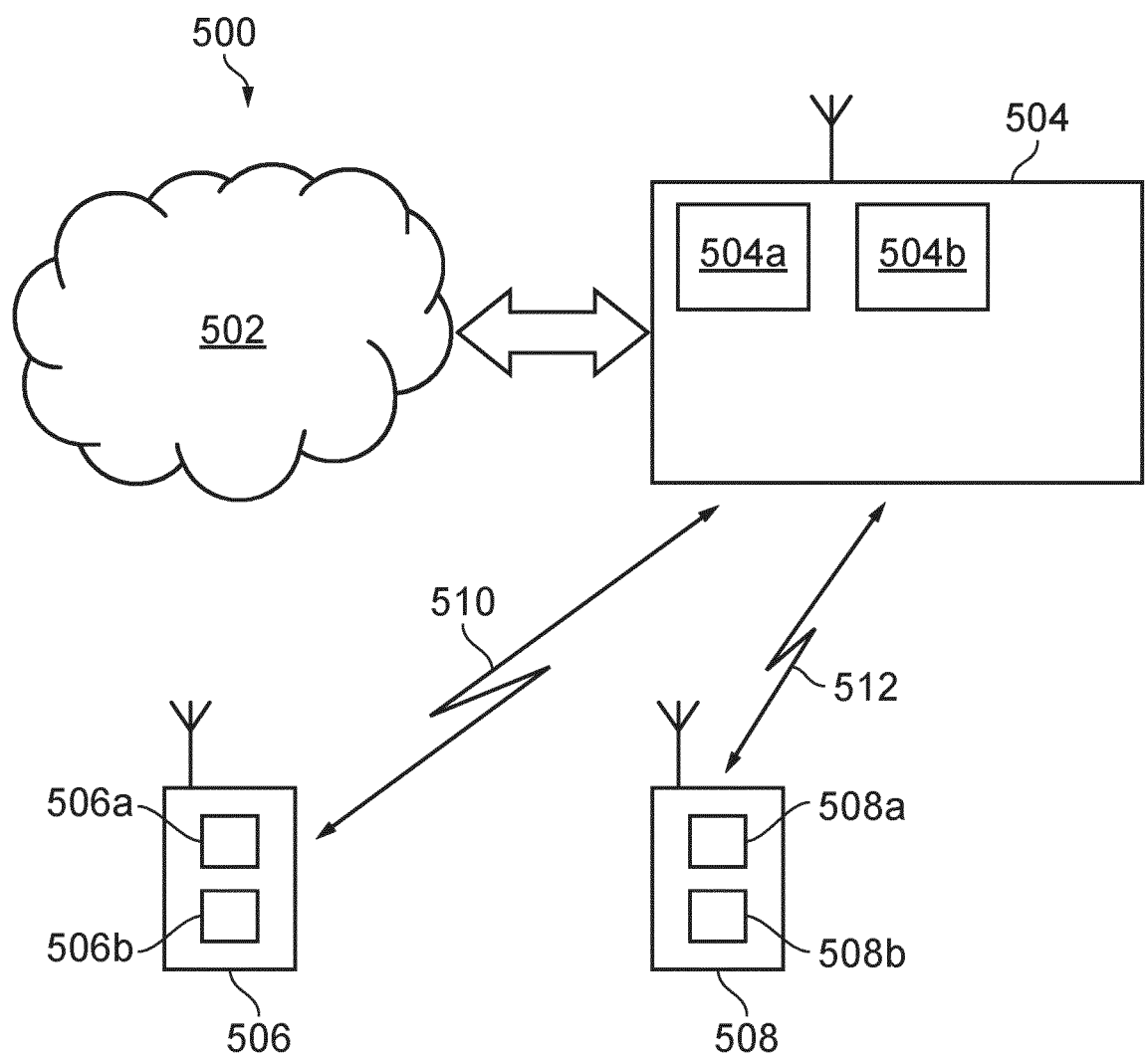
FIG. 4 schematically shows a telecommunications system according to an embodiment of the present disclosure.

FIG. 4 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 4 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 4 may be broadly conventional apart from where modified to provide functionality in accordance with embodiments of the present disclosure as discussed herein.

The terminal devices 506, 508 (which may correspond to the terminal device 104) comprise transceiver circuitry 506*a*, 508*a* (which may also be referred to as a transceiver/transceiver unit) for transmission and reception of wireless signals and processor circuitry 506*b*, 508*b* (which may also be referred to as a processor/processor unit) configured to control the devices 506, 508. The processor circuitry 506*b*, 508*b* may comprise various sub-units/sub-circuits for providing functionality as explained further herein. These sub-units may be implemented as discrete hardware elements or as appropriately configured functions of the processor circuitry. Thus the processor circuitry 506*b*, 508*b* may comprise circuitry which is suitably configured/programmed to provide the desired functionality using conventional programming/configuration techniques for equipment in wireless telecommunications systems. The transceiver circuitry 506*a*, 508*a* and the processor circuitry 506*b*, 508*b* are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the terminal devices 506, 508 will in general comprise various other elements associated with its operating functionality, for example a power source, user interface, and so forth, but these are not shown in FIG. 4 in the interests of simplicity.

The base station 504 (which may correspond to the infrastructure equipment 101) comprises transceiver circuitry 504*a* (which may also be referred to as a transceiver/transceiver unit) for transmission and reception of wireless signals and processor circuitry 504*b* (which may also be referred to as a processor/processor unit) configured to control the base station 504 to operate in accordance with embodiments of the present disclosure as described herein. The processor circuitry 504*b* may comprise various sub-units/sub-circuits for providing desired functionality as explained further herein. These sub-units may be implemented as discrete hardware elements or as appropriately configured functions of the processor circuitry. Thus the processor circuitry 504*b* may comprise circuitry which is suitably configured/programmed to provide the desired functionality described herein using conventional programming/configuration techniques for equipment in wireless telecommunications systems. The transceiver circuitry 504*a* and the processor circuitry 504*b* are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with the terminal devices 506, 508 according to an embodiment of the disclosure over respective communication links 510, 512. The base station 504 is configured to communicate with the terminal device 506 over the associated radio communication link 510 and with the terminal device 508 over the associated radio communication link 512 generally following the established principles of LTE-based of 5G/NR communications, apart from using modified procedures in accordance with certain embodiments of the present disclosure as described herein.

According to an embodiment of the present technique, a first BWP (such as the first BWP 401*a* of FIG. 3) may be deactivated by the communications device 104 in response to receiving an indication transmitted by the infrastructure equipment that one or more different BWPs (such as the second and third BWPs 401*b,c* of FIG. 3) are to be activated. The BWP 401*a* to be deactivated may preferably be the BWP on which the indication was received.

This approach has the benefit of requiring very limited signalling in order to send the indication, since only the identity of the activated BWP(s) needs to be transmitted.

According to the embodiment, the communications device 104 receives an indication from the infrastructure equipment 101 that one or more BWPs 401*b,c* are to be activated, the indication preferably received on a currently activated BWP 401*a*. In response to the receiving, the infrastructure equipment 101 activates the BWPs 401*b,c* to be activated and deactivates the BWP 401*a* on which the indication was received.

Accordingly, the infrastructure equipment 101, having transmitted to the communications device 104 the indication, determines that the communications device 104 has deactivated the BWP 401*a* on which the indication was transmitted. As such, the infrastructure equipment 101 no longer is able to schedule transmissions on the now deactivated BWP 401*a*.

According to a further embodiment, an explicit indication, allowing the communications device 104 to identify one or more BWPs to be deactivated (for example, the second BWP 401*b* of FIG. 3), is transmitted to the communications device 104 by the infrastructure equipment 101. The indication may be communicated in downlink control information (DCI). In order to indicate to the communications device 104 that the DCI contains an indication of which BWP(s) is/are to be deactivated, the DCI may be formatted in a pre-determined manner. For example, a pre-determined radio network temporary identifier (RNTI) may be used to construct the DCI for transmission. The communications device 104 may, having received the DCI and having detected the pre-determined RNTI, thus determine that the DCI contains an indication of one or more BWPs to be deactivated.

In some embodiments, the DCI, when formatted to include an indication of one or more BWPs to be deactivated, does not contain any indication of scheduled transmissions on a shared channel (such as a PDSCH or PUSCH).

In some embodiments, the DCI may be group-common DCI, containing information for multiple communications device 104s. In order to differentiate group-common DCI used to indicate BWPs to be deactivated from other group-common DCI, a pre-determined RNTI may be used in the transmission of the group-common DCI used to indicate BWPs to be deactivated, different from RNTI(s) used for other group-common DCI.

Accordingly, the infrastructure equipment 101 may form DCI comprising an indication identifying one or more BWPs 401*b* to be deactivated. The DCI may be formatted in a pre-determined manner (e.g. DCI format) and/or may be formed with (e.g. some portion may be scrambled with) a pre-determined RNTI, to indicate that it contains an indication of BWPs to be deactivated.

In some embodiments of the present technique, one or more BWPs may be activated by the communications device 104 in response to receiving DLDCI or UL DCI on the primary BWP. Because the primary BWP may be always activated, this provides a method of activating one or more BWPs which is always available.

Alternatively, in some embodiments, DCI transmitted on a default BWP may indicate one or more BWPs to be activated. Preferably, the communications device 104 may determine whether the total number of BWPs activated by means of DCI transmitted on the default BWP exceeds a predetermined number. In response to determining that the total number of BWPs activated by means of the DCI exceeds the predetermined number then the communications device 104 deactivates the default BWP. The predetermined number may be less than the maximum number of activated BWPs which the communications device 104 supports.

In some embodiments, the default BWP may have a relatively low capacity. For example, the bandwidth of the default BWP may span a low frequency range, relative to other configured BWPs. In some embodiments, for example, the default BWP may be defined as the configured BWP having the smallest bandwidth of all configured BWPs. As such, keeping the default BWP activated while other BWPs are activated may provide a limited additional bandwidth or capacity, while resulting in additional power consumption by the communications device. The other BWPs may have higher capacity or be more suited to the current data transmission or reception requirements of the communications device 104.

The predetermined number may be preferably known to the infrastructure equipment 101. Accordingly, the infrastructure equipment 101 may determine that one or more BWPs are to be activated for the communications device 104, and consequently transmits DCI on the default BWP indicating the BWP(s) to be activated. The infrastructure equipment 101 may determine whether the total number of BWPs activated by means of the DCI exceeds the predetermined number. In response to determining that the total number of BWPs activated by means of the DCI exceeds the predetermined number then the infrastructure equipment 101 may determine that the communications device 104 has deactivated the default BWP and the infrastructure equipment 101 therefore refrains from scheduling transmissions on the default BWP.

In some embodiments the default BWP may be used by the infrastructure equipment 101 to transmit DCI indicating that one or more other BWPs are to be activated. In such embodiments, the default BWP may remain activated unless the total number of activated BWPs would exceed the maximum number of activated BWPs which the communications device 104 supports.

In some such embodiments, the default BWP, if not already activated, may be activated automatically whenever an activated BWP (which is not the default BWP) becomes deactivated, for example, as the result of an associated inactivity timer expiring on the activated BWP. This has the effect of ensuring that the default BWP is activated as much as possible, within the constraints of the maximum number of activated BWPs which the communications device 104 supports. As such, the default BWP may be said to have an activation priority which is higher than the activation priority of other (non-default) BWPs which are configured.

If the default BWP is not active (for example, because this would require the number of activated BWPs to exceed the maximum number of activated BWPs which the communications device 104 supports, or for any other reason) then in some embodiments, DCI transmitted by the infrastructure equipment 101 to the communications device 104 on one of the activated non-default BWPs may indicate one or more other (inactivated) BWPs which are to be activated, or may indicate that one or more activated BWPs are to be deactivated.

In some embodiments, the default BWP is activated if another BWP is deactivated and no other BWP remains activated. Similarly, if the default BWP is activated and another BWP is also activated, the default BWP is automatically deactivated. In such embodiments, the default BWP (if not explicitly activated otherwise) may be activated if, and only if, no other BWP is activated. As such, the default BWP may be said to have an activation priority which is lower than the activation priority of other (non-default) BWPs which are configured.

Figure 5:
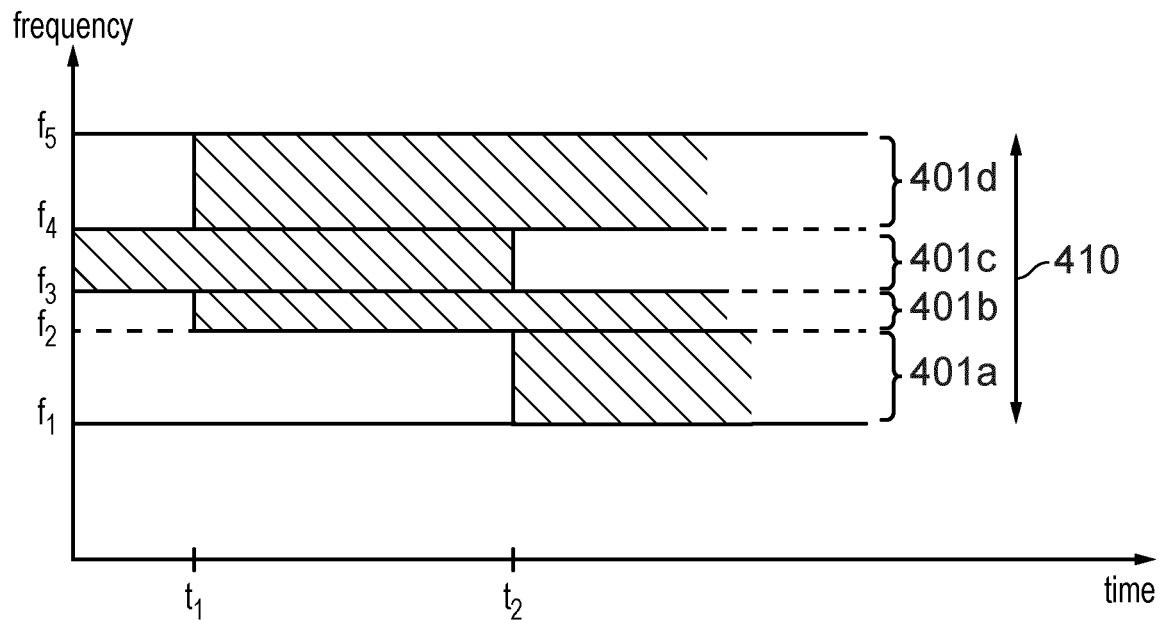
FIG. 5 illustrates the activation and deactivation of bandwidth parts in accordance with embodiments of the present disclosure.

An example of an embodiment of the present technique is shown in FIG. 5. In the example of FIG. 5, the third BWP 401*c* is designated as the default BWP, and the maximum number of activated BWPs which the communications device 104 supports is three.

Prior to time t1, only the third BWP 401*c* (i.e. the default BWP) is activated. At time t1, the second and fourth BWPs (401*b*, 401*d*) are activated. The activation of the second and fourth BWPs may be in response to a demand for data transmission bandwidth, and may be indicated to the communications device 104 by the infrastructure equipment 101 transmitting DCI using the default BWP 401*c*.

Subsequently, at time t2, the first BWP 401*a* is also activated by the communications device 104. The first BWP 401*a* may be activated for example, as a result of receiving DCI on the third BWP 401*c* indicating that the first BWP 401*a* is to be activated. Because the activation of the first BWP 401*a* would result in the number of activated BWPs (four) exceeding the maximum number of activated BWPs which the communications device 104 supports (three), then in accordance with some embodiments of the present technique, the default (third) BWP 401*c* is deactivated.

Figure 6:
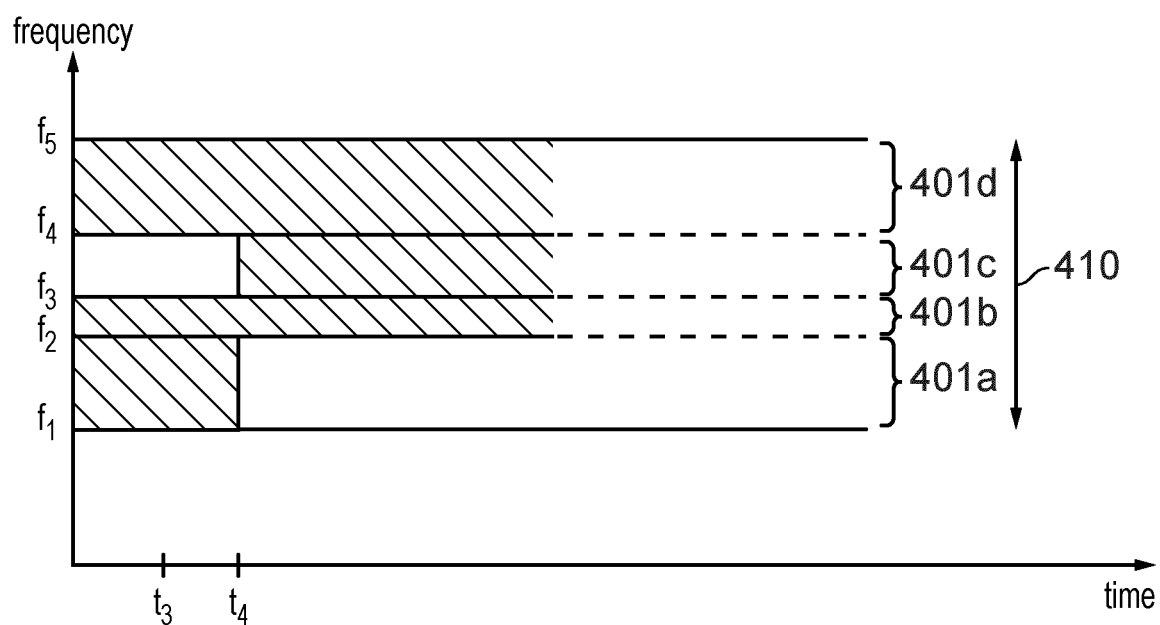
FIG. 6 illustrates an activation of a default bandwidth part (BWP) in response to the expiry of an inactivity timer associated with a non-default BWP, in accordance with embodiments of the present disclosure.

FIG. 6 illustrates an embodiment of the present technique in which the communications device 104 activates a default BWP in response to the expiry of an inactivity timer associated with a non-default BWP.

In the example of FIG. 6, as in FIG. 3, the third BWP 401c is designated as the default BWP, and the maximum number of activated BWPs which the communications device 104 supports is three.

Prior to time t3, three non-default BWPs 401a, 401b and 401d are activated. At time t3, data is transmitted on the first BWP 401a and an inactivity timer is restarted. At time t4, there having been no further data transmission on the first BWP 401a, the inactivity timer expires and the first BWP 401a is deactivated; no other inactivity timer associated with another BWP expires prior to time t4. As a result of this deactivation, and because i) the default BWP is not active, and ii) activating the default BWP would not cause the number of activated BWPs to exceed the maximum number of activated BWPs which the communications device 104 supports, then the default BWP 401c is activated by the communications device 104.

Figure 7:
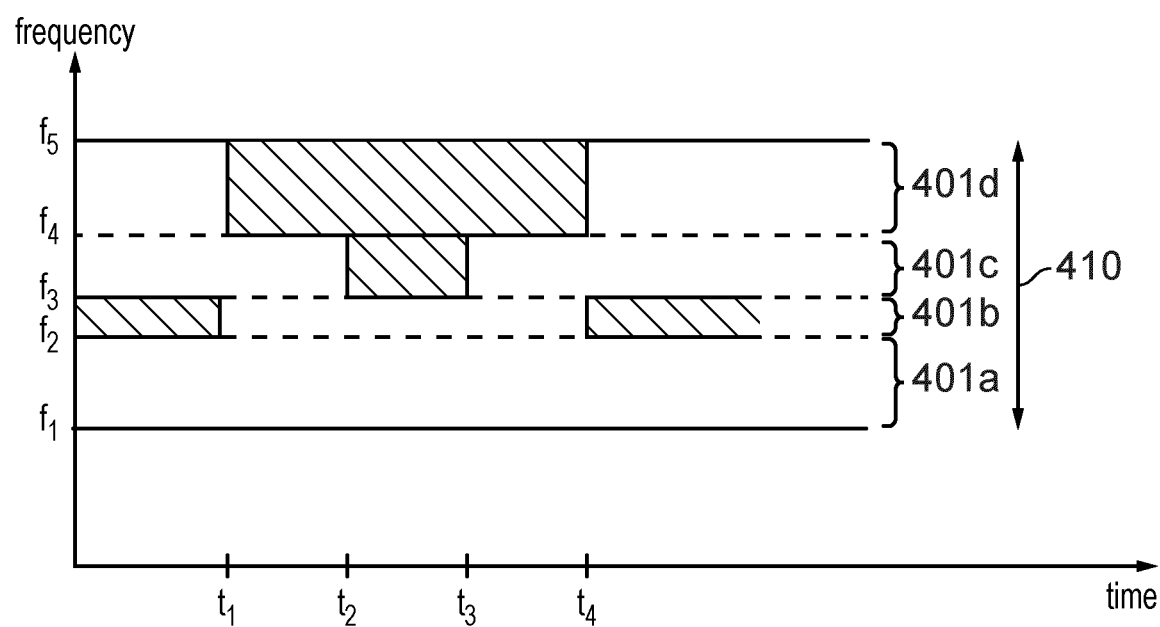
FIG. 7 illustrates further examples of BWP activation and deactivation, in accordance with embodiments of the present technique.

FIG. 7 illustrates further examples of BWP activation and deactivation, in accordance with embodiments of the present technique.

In the example of FIG. 7, the second BWP 401b is designated as the default BWP.

Prior to time t1, only the default BWP 401b is activated. At time t1, a non-default BWP (in this case, the fourth BWP 401d) is activated. Since at least one non-default BWP is activated, the default BWP 401b is deactivated. In other words, the communications device 104 determines whether, as a result of a BWP activation, at least one non-default BWP is (or is to be) activated and, if so, determines whether the default BWP is currently active. If both conditions are met then, when the non-default BWP is activated, the default BWP is deactivated.

In these embodiments, it is possible to activate and deactivate a BWP by means of signalling (for example, DCI) transmitted on an activated, non-default BWP. In the example shown in FIG. 7, at time t2, the third BWP 401c is activated by means of signalling on the fourth BWP 401d.

Subsequently, at time t3, the third BWP 401c is deactivated and, at time t4, the fourth BWP 401d is deactivated. The deactivation of the third and fourth BWPs may be in response to an expiry of an associated inactivity timer, or to explicit signalling, or for any other reason.

At time t4, the communications device 104 determines whether, as a result of the deactivation of the fourth BWP 401d, any non-default BWPs will remain activated. In response to determining that no non-default BWPs will remain activated, the communications device 104 activates the default BWP 401b.

Figure 8:
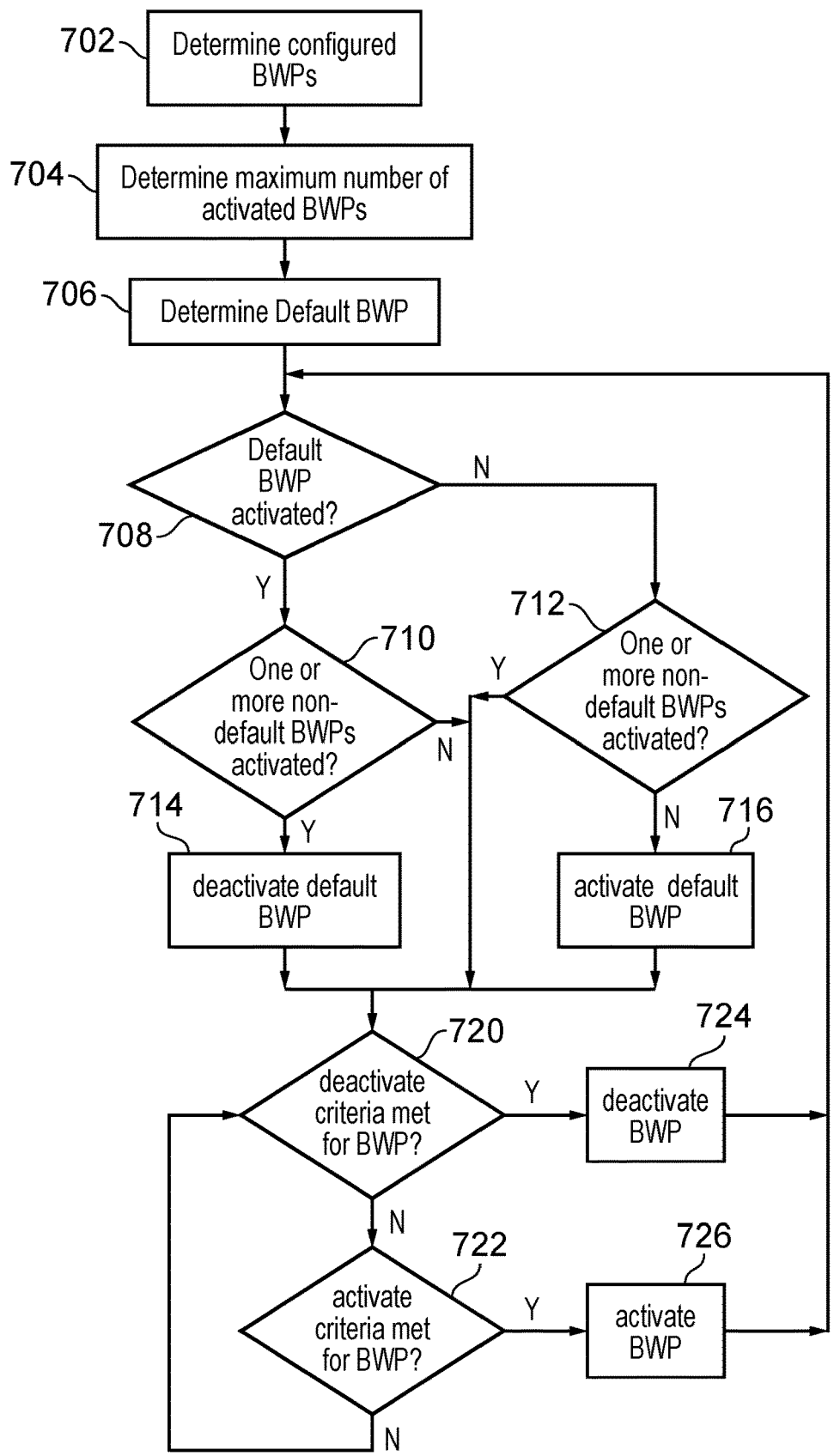
FIG. 8 illustrates a flow chart for a process carried out by a communications device in accordance with embodiments of the present technique.

FIG. 8 illustrates a flow chart for a process carried out by the communications device 104 in accordance with embodiments of the present technique.

The process starts at step 702, at which the communications device 104 determines one or more BWPs. For example, this may be in response to receiving RRC signalling from the infrastructure equipment 101, the RRC signalling comprising an indication of the one or more configured BWPs. the RRC signalling may comprise, for each configured BWP, an index, a frequency range, and the numerology.

The process continues at step 704, in which the communications device 104 determines the maximum number of activated BWPs which the communications device 104 supports. This may be, for example, stored in a memory of the communications device 104.

At step 706, the communications device 104 determines the default BWP. This may be indicated in the RRC signalling described above in step 702. Alternatively, the default BWP may be determined according to a pre-configured rule; for example, it may be the BWP having the highest (or lowest) index number. Alternatively, it may be the BWP having the smallest frequency range.

At step 708, the communications device 104 determines whether the default BWP is in fact activated; that is to say, for example, whether or not the communications device 104 is required to monitor a control channel transmitted using, or associated with, the default BWP.

Based on the outcome of the determination, control then passes to step 710 (if the default BWP is activated) or step 712 (if the default BWP is not activated).

In both steps 710 and 712, the communications device 104 determines whether one or more BWPs other than the default BWP is activated; that is to say, for example, whether or not the communications device 104 is required to monitor a control channel transmitted using, or associated with, a BWP other than the default BWP.

If, at step 710, it is determined that one or more non-default BWPs are activated, then control passes to step 714, in which the default BWP is deactivated. Control then passes to step 720. If, at step 710, it is determined that no non-default BWP is activated, then control passes to step 720.

If, at step 712, it is determined that no non-default BWP is activated, then control passes to step 716, in which the default BWP is activated. Control then passes to step 720. If, at step 712, it is determined that one or more non-default BWPs are activated, then control passes to step 720.

Steps 720 and 722 comprise a determination as to whether or not criteria are met for deactivating (step 720) or activating (step 722) one or more BWPs. Criteria for deactivating may be based on a deactivation timer expiry or explicit signalling, or a determination by the communications device 104 that one or more BWPs should be deactivated, or receipt of signalling indicating a deactivation from the infrastructure equipment 101. The determination by the communications device that one or more of the BWPs should be deactivated may be based on criteria including a data queue amount or other internal assessment of data transmission requirements.

Criteria for activating may be based on an increase in an amount of data for transmission, the generation or receipt of traffic for transmission for which the currently activated BWP(s) is/are not suitable (e.g. because of their numerology) or a receipt of signalling indicating an activation from the infrastructure equipment 101.

If no criteria for activating a BWP are met, and no criteria for deactivating a BWP are met, then steps 720 and 722 are repeated.

If, at step 720, it is determined that criteria for deactivating a BWP are met, then control passes to step 724. At step 724, the one or more BWP for which criteria for deactivation are met are deactivated, and control passes to step 708.

If, at step 722, it is determined that criteria for activating a BWP are met, then control passes to step 726. At step 726, the one or more BWP for which criteria for activation are met are activated, and control passes to step 708.

Thus, by means of the process illustrated in FIG. 8, the communications device 104 activates and deactivates BWPs in response to pre-determined criteria, and activates and deactivates the default BWP based on the activation state of the other (non-default) BWPs.

Preferably, in some embodiments, when control passes to either steps 726 or 724 then, should control subsequently pass (as a result) to either steps 714 or 716, the process should be controlled such that the one of the steps 714 and 716 occur substantially simultaneously with (or alternatively, after a delay of a pre-determined duration starting from) the one of steps 726 and 724.

The example of FIG. 7 above may arise as the result of the process of FIG. 8.

In some embodiments, therefore, the activation and deactivation of the default BWP may be determined based on one or more criteria (which may include, for example, the maximum number of activated BWPs which the communications device 104 can support, and the activation status of other, non-default, BWPs), thereby avoiding the need to explicitly signal to or by the infrastructure equipment 101 when the default BWP is to be activated or deactivated.

In some embodiments, an infrastructure equipment 101 may determine which (if any) BWPs are currently activated for a communications device 104 and which (if any) BWP is to be activated for the communications device 104. Preferably, the algorithm or process (which may be in accordance with one or more embodiments described herein) according to which the communications device 104 activates or deactivates BWPs in response to determining that one or more BWPs are to be activated or deactivated is predetermined and known to the infrastructure equipment 101; for example, the infrastructure equipment 101 may transmit an indication in system information or RRC signalling, received by the communications device 104, the indication indicating what process is to be used by the communications device 104 in respect of BWP activation and deactivation. Alternatively, the process or algorithm may be standardised and documents in appropriate specifications.

In addition, where a primary BWP and/or default BWP is configured at the communications device 104, the identity of these BWPs is known to the infrastructure equipment. This may be by means of predetermined (e.g. standardised) rules according to which the default and/or primary BWPs are selected from the configured BWPs, or by means of an explicit indication transmitted by either the communications device 104 or the infrastructure equipment 101 to the infrastructure equipment 101 or the communications device 104, respectively.

The infrastructure equipment 101 may thus determine which, if any, BWPs will be deactivated or activated by the communications device 104, and may schedule future transmissions accordingly. For example, it may refrain from transmitting control information (such as DCI) using a data channel (such as a PDCCH) on the deactivated BWP(s).

In some embodiments, the BWP designated in the examples above as the default BWP may be additionally or alternatively be designated as a primary BWP, and references to 'default BWP' may, in such embodiments, refer to the primary BWP.

In some embodiments, the infrastructure equipment 101 may transmit an indication of one or more BWPs to be activated or deactivated. The indication of BWPs may be transmitted in a message on a shared channel (for example, the PDSCH). The communications device 104 may receive an indication of the resources of the shared channel used for the transmission of the activation/deactivation message on a control channel (for example, the PDCCH).

In some embodiments, DCI transmitted on a control channel may comprise an indication of the index of each BWP to be activated or deactivated. Where a BWP is to be activated, the DCI may further comprise an indication of the shared channel assignment associated with the BWP, which may comprise an assignment on a shared channel of communications resources within the frequency range of the BWP, for the transmission of data to or by the communications device 104.

In some embodiments of the present technique, criteria for activating one or more BWPs may be met, however, the activation would result in the total number of activated BWPs exceeding the maximum number of BWPs which the communications device 104 can support.

Thus, in some embodiments of the present technique, when one or more BWPs are to be activated, the communications device 104 determines whether, as a result, the total number of activated BWPs would exceed the maximum number of BWPs which the communications device 104 can support.

If such a determination is made, then the communications device 104 may select one or more BWPs which are currently activated, to be deactivated in response, in accordance with a predetermined priority. The number of selected BWPs may preferably be the number required to be deactivated so that the sum of the number of remaining activated BWPs and the number of newly activated BWPs is equal to the maximum number of activated BWPs which can be supported by the communications device 104. The selected BWP(s) may be selected from the currently activated BWPs, according to one or more of:

a BWP(s) having the lowest index of the currently activated BWPs;

a BWP(s) having the highest index of the currently activated BWPs;

the default BWP;

a BWP having a numerology (or aspect thereof) unlike any other currently activated BWP;

a BWP having a numerology (or aspect thereof) in common with one or more other currently activated BWP;

a BWP(s) having a higher sub-carrier spacing;

a BWP(s) having a lower sub-carrier spacing;

a BWP(s) having a lowest remaining deactivation timer; and/or

BWP(s) based on an order in which they were most recently activated, e.g. BWPs most recently activated are selected ("last in, first out") or BWPs least recently activated ("first in, first out").

In some embodiments, instead of selecting from only the BWPs which are currently activated, the communications device 104 may select from the set of BWPs consisting of the currently activated BWPs and those for which the criteria for activation have been met.

The predetermined priority may comprise one or more of the above selections, in a predetermined precedence order. For example, the default BWP may be selected with the highest priority; if it is necessary to select one or more further BWPs, these may be selected from those BWPs having a numerology (or aspect thereof) in common with one or more other.

The predetermined priority may comprise a 'tie-break' rule for selecting amongst multiple BWPs meeting a particular criteria, if it is not necessary to select all such BWPs. For example, the predetermined priority may be to select from BWPs having the lowest sub-carrier spacing, and where multiple such BWPs exist, those BWPs having the lowest index are selected.

The predetermined priority may be indicated by the infrastructure equipment 101 in signalling which is received by the communications device 104. Additionally or alternatively, the priority may be specified in a specification for a standard to which the communications device 104 conforms.

Preferably, the predetermined priority and the maximum number of activated BWPs which can be supported by the communications device 104 are known also to the infrastructure. Therefore, no additional indication needs to be transmitted to or by the infrastructure equipment 101 to indicate the selected BWP(s).

In some embodiments, therefore, an infrastructure equipment 101 may determine which (if any) BWPs are currently activated for the communications device 104. The infrastructure equipment 101 may determine that a BWP, which is currently deactivated for the communications device 104 is to be activated for the communications device 104. For example, the infrastructure equipment 101 may receive a request from the communications device 104 for communications resources to transmit traffic associated with a particular service, or a quality of service, for which the presently activated BWPs are not suitable or not sufficient (or both).

The infrastructure equipment 101 may subsequently transmit an indication to the communications device 104, identifying one or more BWPs that are to be activated by the communications device 104.

The infrastructure equipment 101 may further determine whether the sum of the number of currently activated BWPs for the communications device 104 and the number of BWPs that are to be activated exceeds the maximum number of activated BWPs which can be supported by the communications device 104. If the sum would exceed the maximum number and criteria of activating a new BWP is met, then the infrastructure equipment 101 determines, in accordance with the predetermined priorities, which currently activated BWPs will be selected by the communications device 104 and deactivated.

The infrastructure equipment 101 may thus determine which, if any, BWPs will be deactivated by the communications device 104, and may schedule future transmissions accordingly. For example, it may refrain from transmitting control information (such as DCI) using a data channel (such as a PDCCH) on the deactivated BWP(s)).

Because the predetermined priorities are known to both the infrastructure equipment 101 and the communications device 104, it is not necessary for the identity (or existence) of any BWPs which are to be deactivated to be indicated in any signalling. As such, embodiments of the present technique provide a method for controlling BWPs using a relatively small amount of signalling.

Further advantages of such a priority scheme may be apparent. For example, selecting BWPs based on an index number provides a simple, unambiguous scheme, if no two BWPs share a common index number.

Selecting a BWP based on its numerology (or an aspect thereof) may ensure that either a diverse range of BWPs remains activated (if precedence is given to selecting BWPs having a numerology common to other BWPs, therefore ensuring continued support for diverse application requirements.

Alternatively, selecting a BWP based on its numerology (or an aspect thereof) may ensure that a consistent set of BWPs remains activated, therefore reducing the complexity for the ongoing operation of the communications device 104 since the active BWPs will have fewer different numerologies.

Selecting BWPs based on sub-carrier spacing may prioritize support (i.e. bandwidth and the corresponding data capacity) for services having particular quality of service (latency, throughput, etc.) requirements. For example, selecting for deactivation a BWP(s) having a lower sub-carrier spacing may ensure that sufficient bandwidth remains to effectively support applications or services requiring low latency transmissions.

A BWP(s) having a low remaining deactivation timer is one which, should no further data be transmitted on any activated BWPs, will be deactivated first, in response to the expiry of its associated deactivation timer. As such, prioritizing such a BWP for selection (i.e. for deactivation) may ensure that a BWP which was likely to be soon deactivated in any case (because it had not been recently used for data transmission) may avoid deactivating a more heavily (i.e. recently) used BWP.

Each BWP may have associated with it a control channel (such as a PDCCH), on which control information (such as DCI) may be transmitted. Control information may include scheduling information, indicating communications resources (for example, on a PUSCH or on a PDSCH) which have been scheduled by the infrastructure for the transmission of data to, or by, the communications device 104.

Conventionally, DCI may be decoded 'blind'—that is to say, the communications device 104 may receive signals on the PDCCH, and may attempt to detect within those sequences pre-determined patterns, corresponding to formats of DCI which may comprise information intended for it, without any a priori knowledge of whether, in fact, any DCI destined for the communications device 104 has been transmitted in that instance of the PDCCH. This so-called 'blind decoding' requires significant processing resources. Conventionally, a communications device 104 may be required to attempt to blind decode up to four DCI formats in a given PDCCH instance.

In some embodiments, when there are multiple activated BWPs, the communications device 104 monitors (that is, attempts blind decoding) in every instance of the PDCCH on each of the activated BWPs. In some embodiments, the PDCCH on an activated BWP may be used only to schedule transmissions on the same BWP. Alternatively, in other embodiments, a PDCCH on an activated BWP may schedule a transmission on any of the activated BWPs; in this case, the DCI may include an explicit indication of the BWP on which the scheduled communications resource is located. This provides the greatest flexibility to the infrastructure equipment 101, since it provides the possibility to schedule on multiple BWPs simultaneously, with few or no constraints.

However, in such embodiments, there is the potential for the number of required blind decodes to increase according to the number of activated BWPs.

According to an embodiment of the present technique, the communications device 104 attempts blind decodes on only one PDCCH. For example, the communications device 104 may monitor only the PDCCH associated with the primary BWP. In each slot of the primary BWP, the communications device 104 may attempt to blind decode DCI on the PDCCH. If DCI, comprising scheduling information intended for the communications device 104, is decoded then the communications device 104 determines on which activated BWP the scheduled communications resources are located. This may be explicitly indicated in the DCI. Alternatively, in some embodiments, this may be implicit based on the timing of the PDCCH instance containing the DCI.

Figure 9:
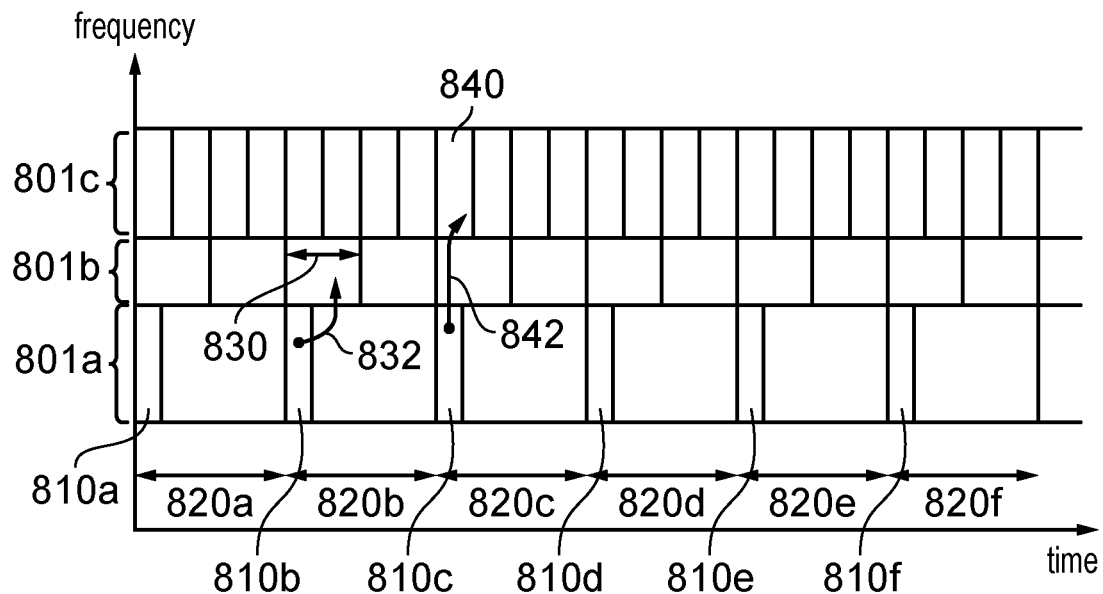
FIG. 9 illustrates a scheme for transmitting scheduling information to a communications device having multiple activated BWPs, in accordance with example embodiments of the present technique.

FIG. 9 illustrates a scheme for transmitting scheduling information to a communications device 104 having multiple activated BWPs, in accordance with example embodiments of the present technique.

FIG. 9 illustrates an example arrangement of first to third activated BWPs 801*a*, 801*b* and 801*c*. The first activated BWP 801*a* is designated as the primary BWP. According to the numerology of the primary BWP 801*a*, its communications resources are arranged in time slots 820*a-f*, and within each slot is a respective PDCCH instance 810*a-f*.

According to the numerology of the second activated BWP 801*b*, each of its slots are half of the duration of a slot of the primary BWP 801*a*. Similarly, each of the slots of the third activated BWP 801*c* are one quarter of the duration of a timeslot of the primary BWP 801*a*.

Each slot of the second and third BWPs 801*b*, 801*c* may comprise a PDCCH instance (not shown for conciseness and clarity).

In the example illustrated in FIG. 9, the infrastructure equipment 101 transmits all scheduling information for the communications device 104 in DCI transmitted on the PDCCH of the primary BWP 801*a*. Thus, for example, an allocation of communications resources in a timeslot 830 of the second BWP 801*b* may be indicated in DCI transmitted in the PDCCH instance 810*b* of the primary BWP 801*a*, as indicated by the arrow 832.

Similarly, an allocation of communications resources in a timeslot 840 of the third BWP 801*c* may be indicated in DCI transmitted in the PDCCH instance 810*c* of the primary BWP 801*a*, as indicated by the arrow 842.

The mapping between PDCCH instance (on which DCI indicating allocated communications resources are transmitted) and BWP on which the corresponding allocated communications resources are located may be predetermined and known to both the communications device 104 and to the infrastructure equipment 101. As such, for example, the communications device 104, having decoded successfully the DCI transmitted in the PDCCH instance 810*c*, may determine, for example, based on the time or slot number of the slot 820*c*, that the DCI refers to resources on the third BWP 801*c*.

Because scheduling information for the communications device 104 for all activated BWPs 801*a-c* is sent on the PDCCH of a single BWP (such as the primary BWP 801*a*), the number of blind decode attempts required for the communications device 104 is significantly reduced.

In the example illustrated in FIG. 9, the infrastructure equipment 101 transmits all scheduling information for the communications device 104 in DCI transmitted on the PDCCH of the primary BWP 801*a*; however, the present disclosure is not so limited. For example, the BWP having the shortest slot duration may be used in order to reduce a scheduling latency.

Figure 10:
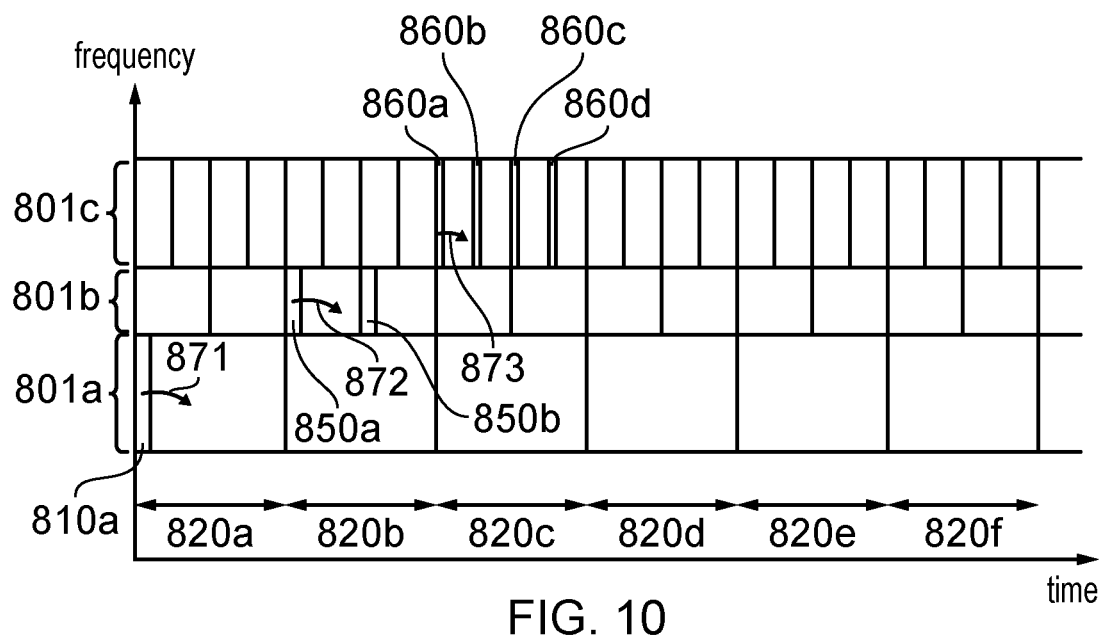
FIG. 10 illustrates a further scheme for transmitting scheduling information to a communications device having multiple activated BWPs, in accordance with example embodiments of the present technique.

FIG. 10 illustrates a further scheme for transmitting scheduling information to the communications device 104 having multiple activated BWPs, in accordance with example embodiments of the present technique.

According to the scheme illustrated in FIG. 10, at any given time (e.g. within any given time slot on a selected BWP, such as the primary BWP), the communications device 104 is required to decode only a single PDCCH instance. The PDCCH instance which the communications device 104 is required to decode (i.e. on which it may receive DCI indicating communications resource allocations) may change over time in accordance with a predetermined schedule. The schedule may be based on, for example, time slot numbers of time slots of a selected BWP, such as the primary BWP. For example, during a first slot 820*a* of the primary BWP, the communications device 104 may decode PDCCH instance 810*a* on the first BWP 801*a*. During the second slot 820*b* of the primary BWP 801*a*, the communications device 104 may decode PDCCH instances 850*a*, 850*b* on the second BWP 801*b*. During the third slot 820*c* of the primary BWP 801*a*, the communications device 104 may decode PDCCH instances 860*a-d* on the third BWP 801*c*. In subsequent slots of the primary BWP 801*a*, the pattern may repeat.

In some embodiments, multiple PDCCH instances may occur on a given BWP within a single time slot of the primary BWP 801*a*. In some embodiments, only a subset of (e.g. only the first) PDCCH instances on a given BWP may be decoded within a single slot of the primary BWP 801*a*. For example, in the third slot 820*c*, the communications device 104 may perform blind decoding only during the PDCCH instance 860*a*, which is the first PDCCH instance on the third BWP 801*c* occurring during the third time slot 820*c*.

The arrows 871, 872 and 873 of FIG. 9 illustrate how DCI transmitted in PDCCH instances 810*a*, 850*a* and 860*a* may indicate scheduled communications resources on the same respective BWP and in the same slot.

DCI transmitted during a PDCCH which is monitored by the communications device 104 may conform to conventional DCI formats for transmission of scheduling information. That is, a given DCI transmitted on a PDCCH may indicated scheduled communications resources only on the BWP on which the PDCCH was transmitted.

Because the communications device 104 is required to only decode a single PDCCH at a given time, the number of blind decode attempts for the communications device 104 is significantly reduced. Furthermore, because scheduling information is transmitted on the BWP on which the scheduled resources are located, no additional information (e.g. identifying a different BWP) needs to be added to the DCI.

In some embodiments, the PDCCH(s) which are monitored by the communications device 104 are determined based on a capability of the communications device 104 indicative of the maximum number of blind decodes which the communications device 104 is able to perform in respect of simultaneously received signals.

For example, the communications device 104 may transmit an indication of the maximum number of blind decodes which the communications device 104 is able to perform in respect of simultaneously received signals to the infrastructure equipment 101.

The communications device 104 determines, prior to receiving a PDCCH instance, whether the total number of simultaneous PDCCH instances (considering all activated BWPs) exceeds its capability to decode DCI from each of the simultaneous PDCCHs. If the communications device 104 determines that this is the case, then a subset of the activated BWPs having simultaneous PDCCHs are selected, based on a predetermined prioritisation scheme, which is known to the infrastructure equipment 101. The prioritisation scheme may be selected from one or more described above in the context of BWP deactivation when the total number of activated BWPs may exceed the maximum number of activated BWPs which the communications device 104 can support.

Thus there has been described a communications device for communicating with an infrastructure equipment of a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and a processor configured to control the transceiver to transmit the signals and to receive the signals, wherein the processor is configured in combination with the transceiver to transmit signals or to receive signals using a first of the plurality of activated bandwidth parts, to receive, via the first activated bandwidth part, an indication of one or more bandwidth parts to be activated, to select one or more bandwidth parts to be de-activated in accordance with a maximum number of activated bandwidth parts permitted for the communications device, and in response to the selecting, to de-activate the selected one or more bandwidth parts.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station.

Thus there has been described a communications device for communicating with an infrastructure equipment of a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and a processor configured to control the transceiver to transmit the signals and to receive the signals, wherein the processor is configured in combination with the transceiver to transmit signals or to receive signals using a first of the plurality of activated bandwidth parts, to receive, via the first activated bandwidth part, an indication of one or more bandwidth parts to be activated, to select one or more bandwidth parts to be de-activated in accordance with a maximum number of activated bandwidth parts permitted for the communications device, and in response to the selecting, to de-activate the selected one or more bandwidth parts.

There has also been described a communications device for communicating with an infrastructure equipment of a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a highest activation priority or a non-default type having an activation priority which is lower than the activation priority of a bandwidth part of the default type, and a processor configured to control the transceiver to transmit the signals and to receive the signals, wherein the processor is configured in combination with the transceiver to determine that one or more of the plurality of activated bandwidth parts is to be deactivated and that a bandwidth part of the default type is not currently activated, and in response to the determining, to activate the bandwidth part of the default type in accordance with a maximum number of activated bandwidth parts permitted for the communications device.

There has also been described a communications device for communicating with an infrastructure equipment of a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a lowest activation priority or a non-default type having an activation priority which is higher than the activation priority of a bandwidth part of the default type, and a processor configured to control the transceiver to transmit the signals and to receive the signals, wherein the processor is configured in combination with the transceiver to transmit signals or to receive signals using a first of the plurality of activated first bandwidth parts, to receive, via the activated first bandwidth part, an indication that each of the plurality of activated bandwidth parts to be de-activated, to determine that no bandwidth part of the default type is activated, and in response to the determining to activate a bandwidth part of the default type.

There has also been described a communications device for communicating with an infrastructure equipment of a wireless communications network, the communications device comprising a transceiver configured to transmit signals and to receive signals on a wireless access interface using a plurality of activated bandwidth parts, each of the bandwidth parts being formed from communications resources of a carrier within a carrier bandwidth, and a processor configured to control the transceiver to transmit the signals and to receive the signals, wherein the processor is configured in combination with the transceiver to receive, via a control channel associated with a selected one of the plurality of activated bandwidth parts, downlink control information during a time slot, the downlink control information comprising an allocation of communications resources on a one of the plurality of activated bandwidth parts, to determine, based on a time slot number of the time slot, the activated bandwidth part on which the communications resources are allocated, and to transmit or receive data using the allocated communications resources.

There has also been described a communications device for communicating with an infrastructure equipment of a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and a processor configured to control the transceiver to transmit the signals and to receive the signals, wherein the processor is configured in combination with the transceiver to select based on a time slot number of a time slot from a plurality of activated bandwidth parts a selected bandwidth part for monitoring during the time slot, and to receive, via a control channel associated with the selected bandwidth parts, downlink control information during a time slot, the downlink control information comprising an allocation of communications resources on the selected bandwidth part.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A communications device for communicating in a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and a processor configured to control the transceiver to transmit the signals and to receive the signals, wherein the processor is configured in combination with the transceiver to transmit signals or to receive signals using a first of the plurality of activated bandwidth parts, to receive, via the first activated bandwidth part, an indication of one or more bandwidth parts to be activated, to select one or more bandwidth parts to be de-activated in accordance with a maximum number of activated bandwidth parts permitted for the communications device, and in response to the selecting, to de-activate the selected one or more bandwidth parts.

Paragraph 2. A communications device according to paragraph 1, wherein the wherein the processor is configured in combination with the transceiver in response to receiving the indication of the one or more bandwidth parts to be activated, to select the first activated bandwidth part as a one of the selected one or more bandwidth parts to be de-activated and to activate at least one other bandwidth part.

Paragraph 3. A communications device according to paragraph 1, wherein the processor is configured in combination with the transceiver to receive, via the activated first bandwidth part, an indication of one or more bandwidth parts to be de-activated; and in response to the receiving, to select as the selected one or more bandwidth parts to be de-activated the indicated one or more bandwidth parts to be deactivated, and the indication of the one or more bandwidth parts to be de-activated comprises downlink control information.

Paragraph 4. A communications device according to paragraph 3, wherein the downlink control information is transmitted using a predetermined radio network temporary identifier, the predetermined radio network temporary identifier indicating that the downlink control information comprises an indication of one or more bandwidth parts to be de-activated.

Paragraph 5. A communications device according to paragraph 3 or paragraph 4, wherein the downlink control information is formatted according to a predetermined format, the predetermined format indicating that the downlink control information comprises an indication of one or more bandwidth parts to be de-activated.

Paragraph 6. A communications device according to any of paragraphs 3 to 5, wherein the downlink control information comprises control information for the communications device and one or more other communications devices.

Paragraph 7. A communications device according to any of paragraphs 1 to 6, wherein the processor is configured in combination with the transceiver to determine that a number of bandwidth parts, including the first activated bandwidth part, are currently activated for communications, to determine that a sum of the number of the one or more bandwidth parts to be activated and the number of the currently activated bandwidth parts exceeds the maximum number of activated bandwidth parts, and in response to the determining, to select from the plurality of activated bandwidth parts the one or more second bandwidth parts to be de-activated in accordance with a predetermined bandwidth part deactivation priority.

Paragraph 8. A communications device according to paragraph 7, wherein each of the plurality of bandwidth parts is associated with an index number and in accordance with the predetermined bandwidth part deactivation priority, the one or more second bandwidth parts are selected based on the index numbers of the currently activated bandwidth parts.

Paragraph 9. A communications device according to paragraph 7 or paragraph 8, wherein two or more of the currently activated bandwidth parts and the one or more bandwidth parts to be activated differ in one or more of a sub-carrier spacing, a configured orthogonal frequency division multiplexing, OFDM, symbol duration and a cyclic prefix length, and in accordance with the predetermined bandwidth part deactivation priority, the one or more second bandwidth parts to be de-activated are selected based on at least one of the sub-carrier spacing, the symbol duration and the cyclic prefix length of the currently activated bandwidth parts.

Paragraph 10. A communications device according to any of paragraphs 7 to 9, wherein each of the currently activated bandwidth parts is associated with a deactivation timer, and in accordance with the predetermined bandwidth part deactivation priority, the one or more second bandwidth parts to be de-activated are selected based on a remaining timer value of the deactivation timer associated with each of the currently activated bandwidth parts.

Paragraph 11. A communications device according to any of paragraphs 7 to 10, wherein in accordance with the predetermined bandwidth part deactivation priority, the one or more second bandwidth parts to be de-activated are selected based on an order in which the currently activated bandwidth parts were activated.

Paragraph 12. A communications device according to any of paragraphs 1 to 11, wherein a one of the plurality of bandwidth parts is designated as a default bandwidth part having a higher priority for de-activation than other ones of the plurality of bandwidth parts and the selected one or more second bandwidth parts to be de-activated comprises the default bandwidth part.

Paragraph 13. A communications device for communicating in a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a highest activation priority or a non-default type having an activation priority which is lower than the activation priority of a bandwidth part of the default type, and a processor configured to control the transceiver to transmit the signals and to receive the signals, wherein the processor is configured in combination with the transceiver to determine that one or more of the plurality of activated bandwidth parts is to be deactivated and that a bandwidth part of the default type is not currently activated, and in response to the determining, to activate the bandwidth part of the default type in accordance with a maximum number of activated bandwidth parts permitted for the communications device.

Paragraph 14. A communications device for communicating in a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a lowest activation priority or a non-default type having an activation priority which is higher than the activation priority of a bandwidth part of the default type, and a processor configured to control the transceiver to transmit the signals and to receive the signals, wherein the processor is configured in combination with the transceiver to transmit signals or to receive signals using a first of the plurality of activated first bandwidth parts, to receive, via the activated first bandwidth part, an indication that each of the plurality of activated bandwidth parts to be de-activated, to determine that no bandwidth part of the default type is activated, and in response to the determining to activate a bandwidth part of the default type.

Paragraph 15. A communications device for communicating in a wireless communications network, the communications device comprising a transceiver configured to transmit signals and to receive signals on a wireless access interface using a plurality of activated bandwidth parts, each of the bandwidth parts being formed from communications resources of a carrier within a carrier bandwidth, and a processor configured to control the transceiver to transmit the signals and to receive the signals, wherein the processor is configured in combination with the transceiver to receive, via a control channel associated with a selected one of the plurality of activated bandwidth parts, downlink control information during a time slot, the downlink control information comprising an allocation of communications resources on a one of the plurality of activated bandwidth parts, to determine, based on a time slot number of the time slot, the activated bandwidth part on which the communications resources are allocated, and to transmit or receive data using the allocated communications resources.

16. A communications device for communicating in a wireless communications network, the communications device comprising a transceiver configured to transmit signals and to receive signals on a wireless access interface of the wireless communications network using a plurality of activated bandwidth parts, each of the bandwidth parts being formed from communications resources of a carrier within a carrier bandwidth, and a processor configured to control the transceiver to transmit the signals and to receive the signals, wherein the processor is configured in combination with the transceiver to select based on a time slot number of a time slot from a plurality of activated bandwidth parts a selected bandwidth part for monitoring during the time slot, and to receive, via a control channel associated with the selected bandwidth parts, downlink control information during a time slot, the downlink control information comprising an allocation of communications resources on the selected bandwidth part.

Paragraph 17. An infrastructure equipment for communicating with a communications device in a wireless communications network, the infrastructure equipment comprising a transceiver configured to transmit signals to and to receive signals on a wireless access interface of the wireless communications network using a plurality of activated bandwidth parts, each of the bandwidth parts being formed from communications resources of a carrier within a carrier bandwidth, and a processor configured to control the transceiver to transmit the signals and to receive the signals, wherein the processor is configured in combination with the transceiver to communicate with the communications device using an activated first bandwidth part, to transmit, via the activated first bandwidth part, an indication of one or more bandwidth parts to be activated, and to determine that a selected one or more second bandwidth parts are de-activated.

Paragraph 18. An infrastructure equipment for communicating with a communications device in a wireless communications network, the infrastructure equipment comprising a transceiver configured to transmit signals to and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a lowest activation priority or non-default type having an activation priority which is higher than the default type, and a processor configured to control the transceiver to transmit the signals and to receive the signals, wherein the processor is configured in combination with the transceiver to determine that one or more of the plurality of activated bandwidth parts is to be deactivated in accordance with a maximum number of activated bandwidth parts permitted for a communications device, and in response to the determining, to activate a default type bandwidth part for the communications device.

Paragraph 19. An infrastructure equipment for communicating with a communications device in a wireless communications network, the infrastructure equipment comprising a transceiver configured to transmit signals to and to receive signals from the communications device on a wireless access interface of the wireless communications network using a plurality of activated bandwidth parts, each of the bandwidth parts being formed from communications resources of a carrier within a carrier bandwidth the maximum number of activated bandwidth parts being greater than one, and a processor configured to control the transceiver to transmit the signals and to receive the signals, wherein the processor is configured in combination with the transceiver to allocate communications resources during a time slot on a first selected one of the plurality of activated bandwidth parts for the transmission or reception of signals to or from the communications device, to select, based on a time slot number of the time slot, a second one of the plurality of activated bandwidth parts, to transmit, via a control channel associated with the second selected one of the plurality of activated bandwidth parts, downlink control information during the time slot, the downlink control information indicating the allocation of the communications resources, and to transmit or receive data to or from the communications device using the allocated communications resources.

Paragraph 20. An infrastructure equipment according to paragraph 19, wherein the first selected one of the plurality of activated bandwidth parts is selected based on the time slot number of a time slot.

Paragraph 21. An infrastructure equipment according to paragraph 19 or paragraph 20, wherein the first selected one of the plurality of activated bandwidth parts and the second one of the plurality of activated bandwidth parts are the same bandwidth part.

Paragraph 22. Circuitry for a communications device for communicating with an infrastructure equipment of a wireless communications network, the communications device comprising transceiver circuitry configured to transmit signals and to receive signals on a wireless access interface of the wireless communications network using a plurality of activated bandwidth parts, each of the bandwidth parts being formed from communications resources of a carrier within a carrier bandwidth, and processor circuitry configured to control the transceiver circuitry to transmit the signals and to receive the signals, wherein the processor circuitry is configured in combination with the transceiver circuitry to transmit signals or to receive signals using a first of the plurality of activated bandwidth parts, to receive, via the first activated bandwidth part, an indication of one or more bandwidth parts to be activated, to select one or more bandwidth parts to be de-activated in accordance with a maximum number of activated bandwidth parts permitted for the communications device, and in response to the selecting, to de-activate the selected one or more bandwidth parts.

Paragraph 23. Circuitry for a communications device for communicating with an infrastructure equipment of a wireless communications network, the communications device comprising transceiver circuitry configured to transmit signals and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a highest activation priority or a non-default type having an activation priority which is lower than the activation priority of a bandwidth part of the default type, and processor circuitry configured to control the transceiver circuitry to transmit the signals and to receive the signals, wherein the processor circuitry is configured in combination with the transceiver circuitry to determine that one or more of the plurality of activated bandwidth parts is to be deactivated and that a bandwidth part of the default type is not currently activated, and in response to the determining, to activate the bandwidth part of the default type in accordance with a maximum number of activated bandwidth parts permitted for the communications device.

Paragraph 24. Circuitry for a communications device for communicating with an infrastructure equipment of a wireless communications network, the communications device comprising transceiver circuitry configured to transmit signals and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a lowest activation priority or a non-default type having an activation priority which is higher than the activation priority of a bandwidth part of the default type, and processor circuitry configured to control the transceiver circuitry to transmit the signals and to receive the signals, wherein the processor circuitry is configured in combination with the transceiver circuitry to transmit signals or to receive signals using a first of the plurality of activated first bandwidth parts, to receive, via the activated first bandwidth part, an indication that each of the plurality of activated bandwidth parts to be de-activated, to determine that no bandwidth part of the default type is activated, and in response to the determining, to activate a bandwidth part of the default type.

Paragraph 25. Circuitry for a communications device for communicating with an infrastructure equipment of a wireless communications network, the communications device comprising transceiver circuitry configured to transmit signals and to receive signals on a wireless access interface using a plurality of activated bandwidth parts, each of the bandwidth parts being formed from communications resources of a carrier within a carrier bandwidth, and processor circuitry configured to control the transceiver circuitry to transmit the signals and to receive the signals, wherein the processor circuitry is configured in combination with the transceiver circuitry to receive, via a control channel associated with a selected one of the plurality of activated bandwidth parts, downlink control information during a time slot, the downlink control information comprising an allocation of communications resources on a one of the plurality of activated bandwidth parts, to determine, based on a time slot number of the time slot, the activated bandwidth part on which the communications resources are allocated, and to transmit or receive data to or from the infrastructure equipment using the allocated communications resources.

Paragraph 26. Circuitry for a communications device for communicating with an infrastructure equipment of a wireless communications network, the communications device comprising transceiver circuitry configured to transmit signals and to receive signals on a wireless access interface of the wireless communications network using a plurality of activated bandwidth parts, each of the bandwidth parts being formed from communications resources of a carrier within a carrier bandwidth, and processor circuitry configured to control the transceiver circuitry to transmit the signals and to receive the signals, wherein the processor circuitry is configured in combination with the transceiver circuitry to select based on a time slot number of a time slot from a plurality of activated bandwidth parts a selected bandwidth part for monitoring during the time slot, and to receive, via a control channel associated with the selected bandwidth parts, downlink control information during a time slot, the downlink control information comprising an allocation of communications resources on the selected bandwidth part.

Paragraph 27. Circuitry for an infrastructure equipment for communicating with a communications device in a wireless communications network, the infrastructure equipment comprising transceiver circuitry configured to transmit signals to and to receive signals on a wireless access interface of the wireless communications network using a plurality of activated bandwidth parts, each of the bandwidth parts being formed from communications resources of a carrier within a carrier bandwidth, and processor circuitry configured to control the transceiver circuitry to transmit the signals and to receive the signals, wherein the processor circuitry is configured in combination with the transceiver circuitry to communicate with the communications device using an activated first bandwidth part, to transmit, via the activated first bandwidth part, an indication of one or more bandwidth parts to be activated, and to determine that a selected one or more second bandwidth parts are de-activated.

Paragraph 28. Circuitry for an infrastructure equipment for communicating with a communications device in a wireless communications network, the infrastructure equipment comprising transceiver circuitry configured to transmit signals to and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a lowest activation priority or non-default type having an activation priority which is higher than the default type, and processor circuitry configured to control the transceiver circuitry to transmit the signals and to receive the signals, wherein the processor circuitry is configured in combination with the transceiver circuitry to determine that one or more of the plurality of activated bandwidth parts is to be deactivated in accordance with a maximum number of activated bandwidth parts permitted for a communications device, and in response to the determining, to activate a default type bandwidth part for the communications device.

Paragraph 29. Circuitry for an infrastructure equipment for communicating with a communications device in a wireless communications network, the infrastructure equipment comprising transceiver circuitry configured to transmit signals to and to receive signals from the communications device on a wireless access interface of the wireless communications network using a plurality of activated bandwidth parts, each of the bandwidth parts being formed from communications resources of a carrier within a carrier bandwidth the maximum number of activated bandwidth parts being greater than one, and processor circuitry configured to control the transceiver circuitry to transmit the signals and to receive the signals, wherein the processor circuitry is configured in combination with the transceiver circuitry to allocate communications resources during a time slot on a first selected one of the plurality of activated bandwidth parts for the transmission or reception of signals to or from the communications device, to select, based on a time slot number of the time slot, a second one of the plurality of activated bandwidth parts, to transmit, via a control channel associated with the second selected one of the plurality of activated bandwidth parts, downlink control information during the time slot, the downlink control information indicating the allocation of the communications resources, and to transmit or receive data to or from the communications device using the allocated communications resources.

Paragraph 30. A method for a communications device to communicate with an infrastructure equipment of a wireless communications network, the method comprising transmitting signals or receiving signals on a wireless access interface of the wireless communications network using a first of a plurality of activated bandwidth parts, each of the bandwidth parts being formed from communications resources of a carrier within a carrier bandwidth, receiving, via the first activated bandwidth part, an indication of one or more bandwidth parts to be activated, selecting one or more bandwidth parts to be de-activated in accordance with a maximum number of activated bandwidth parts permitted for the communications device, and in response to the selecting, de-activating the selected one or more bandwidth parts.

Paragraph 31. A method for a communications device to communicate with an infrastructure equipment of a wireless communications network, the method comprising transmitting signals or receiving signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a highest activation priority or a non-default type having an activation priority which is lower than the activation priority of a bandwidth part of the default type, determining that one or more of the plurality of activated bandwidth parts is to be deactivated and that a bandwidth part of a default type is not currently activated, and in response to the determining, activating the bandwidth part of the default type in accordance with a maximum number of activated bandwidth parts permitted for the communications device.

Paragraph 32. A method for a communications device to communicate with an infrastructure equipment of a wireless communications network, the method comprising transmitting signals or receiving signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a lowest activation priority or a non-default type having an activation priority which is higher than the activation priority of a bandwidth part of the default type, transmitting signals or to receive signals using a first of the plurality of activated first bandwidth parts, receiving, via the activated first bandwidth part, an indication that each of the plurality of activated bandwidth parts to be de-activated, determining that no bandwidth part of the default type is activated, and in response to the determining, activating a bandwidth part of the default type.

Paragraph 33. A method for a communications device to communicate with an infrastructure equipment of a wireless communications network, the method comprising transmitting signals or receiving signals on a wireless access interface using a plurality of activated bandwidth parts, each of the bandwidth parts being formed from communications resources of a carrier within a carrier bandwidth, receiving via a control channel associated with a selected one of the plurality of activated bandwidth parts, downlink control information during a time slot, the downlink control information comprising an allocation of communications resources on a one of the plurality of activated bandwidth parts, determining, based on a time slot number of the time slot, the activated bandwidth part on which the communications resources are allocated, and transmitting or receiving data to or from the infrastructure equipment using the allocated communications resources.

Paragraph 34. A method for a communications device to communicate with an infrastructure equipment of a wireless communications network, the method comprising transmitting signals or receiving signals on a wireless access interface of the wireless communications network using a plurality of activated bandwidth parts, each of the bandwidth parts being formed from communications resources of a carrier within a carrier bandwidth, selecting based on a time slot number of a time slot from a plurality of activated bandwidth parts a selected bandwidth part for monitoring during the time slot, and receiving, via a control channel associated with the selected bandwidth parts, downlink control information during a time slot, the downlink control information comprising an allocation of communications resources on the selected bandwidth part.

Paragraph 35. A method for an infrastructure equipment to communicate with a communications device in a wireless communications network, the method comprising transmitting signals or receiving signals on a wireless access interface of the wireless communications network using a plurality of activated bandwidth parts, each of the bandwidth parts being formed from communications resources of a carrier within a carrier bandwidth, communicating with the communications device using an activated first bandwidth part, transmitting, via the activated first bandwidth part, an indication of one or more bandwidth parts to be activated, and determining that a selected one or more second bandwidth parts are de-activated.

Paragraph 36. A method for an infrastructure equipment to communicate with a communications device in a wireless communications network, the method comprising transmitting signals or receiving signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a lowest activation priority or non-default type having an activation priority which is higher than the default type, determining that one or more of the plurality of activated bandwidth parts is to be deactivated in accordance with a maximum number of activated bandwidth parts permitted for a communications device, and in response to the determining, activating a default type bandwidth part for the communications device.

Paragraph 37. A method for an infrastructure equipment to communicate with a communications device in a wireless communications network, the method comprising transmitting signals to or receiving signals from the communications device on a wireless access interface of the wireless communications network using a plurality of activated bandwidth parts, each of the bandwidth parts being formed from communications resources of a carrier within a carrier bandwidth the maximum number of activated bandwidth parts being greater than one, allocating communications resources during a time slot on a first selected one of the plurality of activated bandwidth parts for the transmission or reception of signals to or from the communications device, selecting, based on a time slot number of the time slot, a second one of the plurality of activated bandwidth parts, transmitting, via a control channel associated with the second selected one of the plurality of activated bandwidth parts, downlink control information during the time slot, the downlink control information indicating the allocation of the communications resources, and transmitting or receiving data to or from the communications device using the allocated communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018

[2] Holma H. and Toskala A, "LTE for UMTS OFDMA and SC-FDMA based radio access", John Wiley and Sons, 2009

[3] TR 38.913, "Study on Scenarios and Requirements for Next Generation Access Technologies (Release 14)".

What is claimed is:

1. A communications device for communicating in a wireless communications network, the communications device comprising:
a transceiver configured to transmit signals and to receive signals on a wireless access interface of the wireless communications network using a plurality of activated bandwidth parts, each of the bandwidth parts being formed from communications resources of a carrier within a carrier bandwidth, and
a processor configured to control the transceiver to transmit the signals and to receive the signals, wherein the processor is configured in combination with the transceiver
to transmit signals or to receive signals using a first of the plurality of activated bandwidth parts,
to receive, via the first activated bandwidth part, an indication of one or more bandwidth parts to be activated,
to select one or more bandwidth parts to be de-activated in accordance with a maximum number of activated bandwidth parts permitted for the communications device, and
in response to selection of the one or more bandwidth parts, to de-activate the selected one or more bandwidth parts,
wherein the bandwidth parts are activated and de-activated as uplink and downlink pairs based on at least one of sub-carrier spacing, symbol duration and cyclic prefix length of the bandwidth parts, and the first active bandwidth part is a primary bandwidth part that always remains active, and the bandwidth parts differ in one or more of the sub-carrier spacing, the symbol duration and the cyclic prefix length.

2. The communications device according to claim 1, wherein the processor is configured in combination with the transceiver
in response to receiving the indication of the one or more bandwidth parts to be activated, to select the first activated bandwidth part as a one of the selected one or more bandwidth parts to be de-activated and to activate at least one other bandwidth part.

3. The communications device according to claim 1, wherein the processor is configured in combination with the transceiver
to receive, via the activated first bandwidth part, an indication of one or more bandwidth parts to be de-activated; and
in response to receiving the indication, to select as the selected one or more bandwidth parts to be de-activated the indicated one or more bandwidth parts to be deactivated, and
the indication of the one or more bandwidth parts to be de-activated comprises downlink control information.

4. The communications device according to claim 3, wherein the downlink control information is transmitted using a predetermined radio network temporary identifier, the predetermined radio network temporary identifier indicating that the downlink control information comprises an indication of one or more bandwidth parts to be de-activated.

5. The communications device according to claim 3, wherein the downlink control information is formatted according to a predetermined format, the predetermined format indicating that the downlink control information comprises an indication of one or more bandwidth parts to be de-activated.

6. The communications device according to claim 3, wherein the downlink control information comprises control information for the communications device and one or more other communications devices.

7. The communications device according to claim 1, wherein
the processor is configured in combination with the transceiver
to determine that a number of bandwidth parts, including the first activated bandwidth part, are currently activated for communications,
to determine that a sum of the number of the one or more bandwidth parts to be activated and the number of the currently activated bandwidth parts exceeds the maximum number of activated bandwidth parts, and
in response to determining that the sum of the number of the one or more bandwidth parts and the number of the currently activated bandwidth parts exceeds the maximum number of activated bandwidth parts, to select from the plurality of activated bandwidth parts the one or more second bandwidth parts to be de-activated in accordance with a predetermined bandwidth part deactivation priority.

8. The communications device according to claim 7, wherein each of the plurality of bandwidth parts is associated with an index number and
in accordance with the predetermined bandwidth part deactivation priority, the one or more second bandwidth parts are selected based on the index numbers of the currently activated bandwidth parts.

9. The communications device according to claim 7,
in accordance with the predetermined bandwidth part deactivation priority, the one or more second bandwidth parts to be de-activated are selected based on at least one of the sub-carrier spacing, the symbol duration and the cyclic prefix length of the currently activated bandwidth parts.

10. The communications device according to claim 7, wherein
each of the currently activated bandwidth parts is associated with a deactivation timer, and
in accordance with the predetermined bandwidth part deactivation priority, the one or more second bandwidth parts to be de-activated are selected based on a remaining timer value of the deactivation timer associated with each of the currently activated bandwidth parts.

11. The communications device according to claim 7, wherein
in accordance with the predetermined bandwidth part deactivation priority, the one or more second bandwidth parts to be de-activated are selected based on an order in which the currently activated bandwidth parts were activated.

12. The communications device according to claim 1, wherein a one of the plurality of bandwidth parts is designated as a default bandwidth part having a higher priority for de-activation than other ones of the plurality of bandwidth parts and
the selected one or more second bandwidth parts to be de-activated comprises the default bandwidth part.

13. The communications device according to claim 1, wherein the one or more bandwidth parts do not overlap in frequency.

14. The communications device according to claim 1, wherein the one or more bandwidth parts overlap in frequency.

15. The communications device according to claim 1, wherein the processor is configured in combination with the transceiver to deactivate a bandwidth part over which an indication of one or more bandwidth parts to be activated is received.

16. The communications device according to claim 1, wherein the first active bandwidth part is a default bandwidth part having a smaller bandwidth that any of the one or more bandwidth parts.

17. A communications device for communicating in a wireless communications network, the communications device comprising:
a transceiver configured to transmit signals and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a highest activation priority or a non-default type having an activation priority which is lower than the activation priority of a bandwidth part of the default type, and
a processor configured to control the transceiver to transmit the signals and to receive the signals, wherein the processor is configured in combination with the transceiver
to determine that one or more of the plurality of activated bandwidth parts is to be deactivated and that a bandwidth part of the default type is not currently activated, and in response to determining that the one or more of the plurality of activated bandwidth parts is to be deactivated, to activate the bandwidth part of the default type in accordance with a maximum number of activated bandwidth parts permitted for the communications device, wherein the bandwidth parts are activated and de-activated as uplink and downlink pairs based on at least one of sub-carrier spacing, symbol duration and cyclic prefix length of the bandwidth parts, and the first active bandwidth part is a primary bandwidth part that always remains active, and the bandwidth parts differ in one or more of the sub-carrier spacing, the symbol duration and the cyclic prefix length.

18. A communications device for communicating in a wireless communications network, the communications device comprising:

a transceiver configured to transmit signals and to receive signals on a wireless access interface of the wireless communications network using a plurality of activated bandwidth parts, each of the bandwidth parts being formed from communications resources of a carrier within a carrier bandwidth, and each of the plurality of activated bandwidth parts being of either a default type having a lowest activation priority or a non-default type having an activation priority which is higher than the activation priority of a bandwidth part of the default type, and a processor configured to control the transceiver to transmit the signals and to receive the signals, wherein the processor is configured in combination with the transceiver to transmit signals or to receive signals using a first of the plurality of activated first bandwidth parts, to receive, via the activated first bandwidth part, an indication that each of the plurality of activated bandwidth parts to be de-activated, to determine that no bandwidth part of the default type is activated, and in response to determining that no bandwidth part of the default type is activated, to activate a bandwidth part of the default type, wherein the bandwidth parts are activated and deactivated as uplink and downlink pairs based on at least one of sub-carrier spacing, symbol duration and cyclic prefix length of the bandwidth parts, and the first active bandwidth part is a primary bandwidth part that always remains active, and the bandwidth parts differ in one or more of the sub-carrier spacing, the symbol duration and the cyclic prefix length.

* * * * *